United States Patent
Ganichev et al.

(10) Patent No.: US 9,313,129 B2
(45) Date of Patent: Apr. 12, 2016

(54) LOGICAL ROUTER PROCESSING BY NETWORK CONTROLLER

(71) Applicant: Nicira, Inc., Palo Alto, CA (US)

(72) Inventors: Igor Ganichev, Mountain View, CA (US); Ronghua Zhang, San Jose, CA (US); Teemu Koponen, San Francisco, CA (US); Gleb Dubovik, Burlingame, CA (US); Pankaj Thakkar, Santa Clara, CA (US)

(73) Assignee: NICIRA, INC., Palo Alto, CA (US)

( * ) Notice: Subject to any disclaimer, the term of this patent is extended or adjusted under 35 U.S.C. 154(b) by 0 days.

(21) Appl. No.: 14/214,545

(22) Filed: Mar. 14, 2014

(65) Prior Publication Data
US 2015/0263952 A1 Sep. 17, 2015

(51) Int. Cl.
*H04L 12/26* (2006.01)
*H04L 12/28* (2006.01)
(Continued)

(52) U.S. Cl.
CPC .......... *H04L 45/745* (2013.01); *H04L 41/0813* (2013.01)

(58) Field of Classification Search
CPC ............ H04L 12/2424; H04L 12/2613; H04L 12/4641; H04L 12/4675; H04L 12/5689; H04L 12/5696; H04L 41/00; H04L 41/0226; H04L 41/0803; H04L 41/0813; H04L 41/0823; H04L 41/0893; H04L 41/0896; H04L 41/12; H04L 41/20; H04L 43/026; H04L 43/0811; H04L 45/00; H04L 45/02; H04L 45/14; H04L 45/54; H04L 45/66; H04L 45/586; H04L 45/745; H04L 47/2441; H04L 49/15; H04L 49/70; H04L 49/354; H04L 49/1546; H04L 49/3063; H04L 61/103; H04L 61/256; H04L 61/2517; H04L 67/10; G06F 8/71; G06F 9/455; G06F 9/45595; G06F 9/45533; G06F 11/07; G06F 15/17312; G06F 2009/4557
USPC ......... 370/230, 235, 396–399, 400–401, 409; 709/223, 238–244
See application file for complete search history.

(56) References Cited

U.S. PATENT DOCUMENTS

| 5,504,921 A | 4/1996 | Dev et al. |
|---|---|---|
| 5,550,816 A | 8/1996 | Hardwick et al. |

(Continued)

FOREIGN PATENT DOCUMENTS

| EP | 1653688 | 5/2006 |
|---|---|---|
| JP | 2003-069609 | 3/2003 |

(Continued)

OTHER PUBLICATIONS

Portions of prosecution history of U.S. Appl. No. 14/214,544, Oct. 7, 2015, Ganichev, Igor, et al.

(Continued)

*Primary Examiner* — Tri H Phan
(74) *Attorney, Agent, or Firm* — Adeli LLP

(57) ABSTRACT

Some embodiments provide a network controller for managing a logical network implemented across several managed network elements. The logical network includes at least one logical router. The network controller includes an input interface for receiving configuration state for the logical router. The network controller includes a table mapping engine for generating data tuples for distribution to the managed network elements in order for the managed network elements to implement the logical router. The network controller includes a route processing engine for receiving a set of input routes from the table mapping engine based on the configuration state for the logical router, performing a recursive route traversal process to generate a set of output routes, and returning the set of output routes to the table mapping engine. The table mapping engine uses the set of output routes to generate the data tuples for distribution to the plurality of managed network elements.

22 Claims, 18 Drawing Sheets

(51) Int. Cl.
*G06F 15/173* (2006.01)
*H04L 12/741* (2013.01)
*H04L 12/24* (2006.01)

(56) References Cited

U.S. PATENT DOCUMENTS

| | | | |
|---|---|---|---|
| 5,751,967 A | 5/1998 | Raab et al. | |
| 6,006,275 A | 12/1999 | Picazo, Jr. et al. | |
| 6,104,699 A | 8/2000 | Holender et al. | |
| 6,219,699 B1 | 4/2001 | McCloghrie et al. | |
| 6,359,909 B1 | 3/2002 | Ito et al. | |
| 6,456,624 B1 | 9/2002 | Eccles et al. | |
| 6,512,745 B1 | 1/2003 | Abe et al. | |
| 6,539,432 B1 | 3/2003 | Taguchi et al. | |
| 6,680,934 B1 | 1/2004 | Cain | |
| 6,785,843 B1 | 8/2004 | McRae et al. | |
| 6,941,487 B1 | 9/2005 | Balakrishnan et al. | |
| 6,950,428 B1 | 9/2005 | Horst et al. | |
| 6,963,585 B1 | 11/2005 | Le Pennec et al. | |
| 6,999,454 B1 | 2/2006 | Crump | |
| 7,046,630 B2 | 5/2006 | Abe et al. | |
| 7,197,572 B2 | 3/2007 | Matters et al. | |
| 7,200,144 B2 | 4/2007 | Terrell et al. | |
| 7,209,439 B2 | 4/2007 | Rawlins et al. | |
| 7,260,648 B2 | 8/2007 | Tingley et al. | |
| 7,283,473 B2 | 10/2007 | Arndt et al. | |
| 7,342,916 B2 | 3/2008 | Das et al. | |
| 7,391,771 B2 | 6/2008 | Orava et al. | |
| 7,447,197 B2* | 11/2008 | Terrell et al. | 370/360 |
| 7,450,598 B2 | 11/2008 | Chen et al. | |
| 7,463,579 B2 | 12/2008 | Lapuh et al. | |
| 7,478,173 B1 | 1/2009 | Delco | |
| 7,555,002 B2 | 6/2009 | Arndt et al. | |
| 7,606,260 B2 | 10/2009 | Oguchi et al. | |
| 7,643,488 B2 | 1/2010 | Khanna et al. | |
| 7,649,851 B2 | 1/2010 | Takashige et al. | |
| 7,653,747 B2* | 1/2010 | Lucco et al. | 709/245 |
| 7,710,874 B2 | 5/2010 | Balakrishnan et al. | |
| 7,764,599 B2 | 7/2010 | Doi et al. | |
| 7,792,987 B1 | 9/2010 | Vohra et al. | |
| 7,818,452 B2 | 10/2010 | Matthews et al. | |
| 7,826,482 B1 | 11/2010 | Minei et al. | |
| 7,839,847 B2 | 11/2010 | Nadeau et al. | |
| 7,885,276 B1 | 2/2011 | Lin | |
| 7,936,770 B1 | 5/2011 | Frattura et al. | |
| 7,937,438 B1 | 5/2011 | Miller et al. | |
| 7,948,986 B1 | 5/2011 | Ghosh et al. | |
| 7,953,865 B1 | 5/2011 | Miller et al. | |
| 7,991,859 B1 | 8/2011 | Miller et al. | |
| 7,995,483 B1 | 8/2011 | Bayar et al. | |
| 8,027,260 B2* | 9/2011 | Venugopal | H04L 41/0806 370/238 |
| 8,027,354 B1 | 9/2011 | Portolani et al. | |
| 8,031,633 B2 | 10/2011 | Bueno et al. | |
| 8,046,456 B1 | 10/2011 | Miller et al. | |
| 8,054,832 B1 | 11/2011 | Shukla et al. | |
| 8,055,789 B2 | 11/2011 | Richardson et al. | |
| 8,060,875 B1 | 11/2011 | Lambeth | |
| 8,131,852 B1 | 3/2012 | Miller et al. | |
| 8,149,737 B2 | 4/2012 | Metke et al. | |
| 8,155,028 B2 | 4/2012 | Abu-Hamdeh et al. | |
| 8,166,201 B2 | 4/2012 | Richardson et al. | |
| 8,194,674 B1 | 6/2012 | Pagel et al. | |
| 8,199,750 B1 | 6/2012 | Schultz et al. | |
| 8,223,668 B2 | 7/2012 | Allan et al. | |
| 8,224,931 B1 | 7/2012 | Brandwine et al. | |
| 8,224,971 B1 | 7/2012 | Miller et al. | |
| 8,239,572 B1 | 8/2012 | Brandwine et al. | |
| 8,265,075 B2 | 9/2012 | Pandey | |
| 8,281,067 B2 | 10/2012 | Stolowitz | |
| 8,312,129 B1 | 11/2012 | Miller et al. | |
| 8,339,959 B1 | 12/2012 | Moisand et al. | |
| 8,339,994 B2 | 12/2012 | Gnanasekaran et al. | |
| 8,351,418 B2 | 1/2013 | Zhao et al. | |
| 8,456,984 B2 | 6/2013 | Ranganathan et al. | |
| 8,504,718 B2 | 8/2013 | Wang et al. | |
| 8,565,108 B1 | 10/2013 | Marshall et al. | |
| 8,600,908 B2* | 12/2013 | Lin | G06Q 10/08 705/334 |
| 8,611,351 B2 | 12/2013 | Gooch et al. | |
| 8,612,627 B1 | 12/2013 | Brandwine | |
| 8,625,603 B1 | 1/2014 | Ramakrishnan et al. | |
| 8,625,616 B2 | 1/2014 | Vobbilisetty et al. | |
| 8,644,188 B1 | 2/2014 | Brandwine et al. | |
| 8,660,129 B1 | 2/2014 | Brendel et al. | |
| 8,958,298 B2* | 2/2015 | Zhang et al. | 370/235 |
| 9,059,999 B2 | 6/2015 | Koponen et al. | |
| 9,137,052 B2 | 9/2015 | Koponen et al. | |
| 2001/0043614 A1 | 11/2001 | Viswanadham et al. | |
| 2002/0093952 A1 | 7/2002 | Gonda | |
| 2002/0194369 A1 | 12/2002 | Rawlins et al. | |
| 2003/0041170 A1 | 2/2003 | Suzuki | |
| 2003/0058850 A1 | 3/2003 | Rangarajan et al. | |
| 2003/0069972 A1 | 4/2003 | Yoshimura et al. | |
| 2004/0073659 A1 | 4/2004 | Rajsic et al. | |
| 2004/0098505 A1 | 5/2004 | Clemmensen | |
| 2004/0267866 A1 | 12/2004 | Carollo et al. | |
| 2005/0018669 A1 | 1/2005 | Arndt et al. | |
| 2005/0027881 A1 | 2/2005 | Figueira et al. | |
| 2005/0053079 A1 | 3/2005 | Havala | |
| 2005/0083953 A1 | 4/2005 | May | |
| 2005/0120160 A1 | 6/2005 | Plouffe et al. | |
| 2005/0132044 A1 | 6/2005 | Guingo et al. | |
| 2006/0002370 A1 | 1/2006 | Rabie et al. | |
| 2006/0026225 A1 | 2/2006 | Canali et al. | |
| 2006/0029056 A1 | 2/2006 | Perera et al. | |
| 2006/0056412 A1 | 3/2006 | Page | |
| 2006/0092940 A1 | 5/2006 | Ansari et al. | |
| 2006/0092976 A1 | 5/2006 | Lakshman et al. | |
| 2006/0174087 A1 | 8/2006 | Hashimoto et al. | |
| 2006/0187908 A1 | 8/2006 | Shimozono et al. | |
| 2006/0193266 A1 | 8/2006 | Siddha et al. | |
| 2006/0291388 A1 | 12/2006 | Amdahl et al. | |
| 2007/0043860 A1 | 2/2007 | Pabari | |
| 2007/0064673 A1 | 3/2007 | Bhandaru et al. | |
| 2007/0140128 A1 | 6/2007 | Klinker et al. | |
| 2007/0156919 A1 | 7/2007 | Potti et al. | |
| 2007/0201357 A1 | 8/2007 | Smethurst et al. | |
| 2007/0297428 A1 | 12/2007 | Bose et al. | |
| 2008/0002579 A1 | 1/2008 | Lindholm et al. | |
| 2008/0002683 A1 | 1/2008 | Droux et al. | |
| 2008/0013474 A1 | 1/2008 | Nagarajan et al. | |
| 2008/0049621 A1 | 2/2008 | McGuire et al. | |
| 2008/0049646 A1 | 2/2008 | Lu | |
| 2008/0059556 A1 | 3/2008 | Greenspan et al. | |
| 2008/0071900 A1 | 3/2008 | Hecker et al. | |
| 2008/0086726 A1 | 4/2008 | Griffith et al. | |
| 2008/0159301 A1 | 7/2008 | de Heer | |
| 2008/0189769 A1 | 8/2008 | Casado et al. | |
| 2008/0225853 A1 | 9/2008 | Melman et al. | |
| 2008/0240122 A1 | 10/2008 | Richardson et al. | |
| 2008/0253366 A1 | 10/2008 | Zuk et al. | |
| 2008/0291910 A1 | 11/2008 | Tadimeti et al. | |
| 2009/0031041 A1 | 1/2009 | Clemmensen | |
| 2009/0043823 A1 | 2/2009 | Iftode et al. | |
| 2009/0083445 A1 | 3/2009 | Ganga | |
| 2009/0092137 A1 | 4/2009 | Haigh et al. | |
| 2009/0122710 A1 | 5/2009 | Bar-Tor et al. | |
| 2009/0150527 A1 | 6/2009 | Tripathi et al. | |
| 2009/0161547 A1 | 6/2009 | Riddle et al. | |
| 2009/0249470 A1 | 10/2009 | Litvin et al. | |
| 2009/0249473 A1 | 10/2009 | Cohn | |
| 2009/0279536 A1 | 11/2009 | Unbehagen et al. | |
| 2009/0292858 A1 | 11/2009 | Lambeth et al. | |
| 2009/0300210 A1 | 12/2009 | Ferris | |
| 2009/0303880 A1 | 12/2009 | Maltz et al. | |
| 2010/0046531 A1 | 2/2010 | Louati et al. | |
| 2010/0131636 A1 | 5/2010 | Suri et al. | |
| 2010/0153554 A1 | 6/2010 | Anschutz et al. | |
| 2010/0153701 A1 | 6/2010 | Shenoy et al. | |
| 2010/0165877 A1 | 7/2010 | Shukla et al. | |
| 2010/0169467 A1 | 7/2010 | Shukla et al. | |
| 2010/0192225 A1 | 7/2010 | Ma et al. | |
| 2010/0205479 A1 | 8/2010 | Akutsu et al. | |

(56) References Cited

U.S. PATENT DOCUMENTS

| | | | |
|---|---|---|---|
| 2010/0214949 | A1 | 8/2010 | Smith et al. |
| 2010/0275199 | A1 | 10/2010 | Smith et al. |
| 2010/0290485 | A1 | 11/2010 | Martini et al. |
| 2011/0016215 | A1 | 1/2011 | Wang |
| 2011/0032830 | A1 | 2/2011 | Merwe et al. |
| 2011/0075664 | A1 | 3/2011 | Lambeth et al. |
| 2011/0075674 | A1 | 3/2011 | Li et al. |
| 2011/0085557 | A1 | 4/2011 | Gnanasekaram et al. |
| 2011/0085559 | A1 | 4/2011 | Chung et al. |
| 2011/0103259 | A1 | 5/2011 | Aybay et al. |
| 2011/0119748 | A1 | 5/2011 | Edwards et al. |
| 2011/0134931 | A1 | 6/2011 | Merwe et al. |
| 2011/0142053 | A1 | 6/2011 | Van Der Merwe et al. |
| 2011/0194567 | A1 | 8/2011 | Shen |
| 2011/0205931 | A1 | 8/2011 | Zhou et al. |
| 2011/0261825 | A1 | 10/2011 | Ichino |
| 2011/0299534 | A1 | 12/2011 | Koganti et al. |
| 2011/0310899 | A1 | 12/2011 | Alkhatib et al. |
| 2012/0014386 | A1 | 1/2012 | Xiong et al. |
| 2012/0131643 | A1 | 5/2012 | Cheriton |
| 2012/0236734 | A1 | 9/2012 | Sampath et al. |
| 2013/0007740 | A1 | 1/2013 | Kikuchi et al. |
| 2013/0044636 | A1 | 2/2013 | Koponen et al. |
| 2013/0103818 | A1* | 4/2013 | Koponen et al. ............ 709/223 |
| 2013/0132536 | A1* | 5/2013 | Zhang ................ H04L 41/0823 709/221 |
| 2013/0142048 | A1 | 6/2013 | Gross et al. |
| 2013/0148541 | A1 | 6/2013 | Zhang et al. |
| 2013/0148542 | A1 | 6/2013 | Zhang et al. |
| 2013/0148543 | A1 | 6/2013 | Koponen et al. |
| 2013/0148656 | A1 | 6/2013 | Zhang et al. |
| 2013/0151661 | A1 | 6/2013 | Koponen et al. |
| 2013/0151676 | A1 | 6/2013 | Thakkar et al. |
| 2013/0212148 | A1* | 8/2013 | Koponen et al. ............ 709/201 |
| 2013/0329548 | A1 | 12/2013 | Nakil et al. |
| 2013/0332602 | A1 | 12/2013 | Nakil et al. |
| 2013/0332619 | A1 | 12/2013 | Xie et al. |
| 2013/0339544 | A1 | 12/2013 | Mithyantha |
| 2014/0195666 | A1 | 7/2014 | Dumitriu et al. |
| 2014/0229945 | A1* | 8/2014 | Barkai et al. ..................... 718/1 |
| 2015/0063360 | A1* | 3/2015 | Thakkar ............... H04L 45/745 370/400 |
| 2015/0263897 | A1 | 9/2015 | Ganichev et al. |
| 2015/0271011 | A1* | 9/2015 | Neginhal ............ H04L 41/0803 370/254 |
| 2015/0271303 | A1* | 9/2015 | Neginhal ................ H04L 45/74 370/392 |

FOREIGN PATENT DOCUMENTS

| | | |
|---|---|---|
| JP | 2003-124976 | 4/2003 |
| JP | 2003-318949 | 11/2003 |
| WO | 2005/112390 | 11/2005 |
| WO | 2008/095010 | 8/2008 |
| WO | 2013/184846 | 12/2013 |

OTHER PUBLICATIONS

Agarwal, Sugam, et al., "Traffic Engineering in Software Defined Networks," 2013 Proceedings IEEE INFOCOM, Apr. 14, 2013, pp. 2211-2219, Bell Labs, Alcatel-Lucent, Holmdel, NJ, USA.
Al-Fares, Mohammad, et al., "A Scalable, Commodity Data Center Network Architecture," Aug. 17-22, 2008, pp. 63-74, Seattle, Washington, USA.
Andersen, David, et al., "Resilient Overlay Networks," Oct. 2001, 15 pages, 18th ACM Symp. On Operating Systems Principles (SOSP), Banff, Canada, ACM.
Anderson, Thomas, et al., "Overcoming the Internet Impasse through Virtualization," Apr. 2005, pp. 34-41, IEEE Computer Society.
Anhalt, Fabienne, et al., "Analysis and evaluation of a XEN based virtual router," Sep. 2008, pp. 1-60, Unite de recherché INRA Phone-Alpes, Montbonnot Saint-Ismier, France.
Anwer, Muhammad Bilal, et al., "Building A Fast, Virtualized Data Plane with Programmable Hardware," Aug. 17, 2009, pp. 1-8, VISA'09, Barcelona, Spain, ACM.
Author Unknown, "Cisco VN-Link: Virtualization-Aware Networking," Month Unknown, 2009, 10 pages, Cisco Systems, Inc.
Author Unknown, "Citrix Launches New XenServer Release as Market Share Growth Continues," Oct. 6, 2010, 3 pages, Citrix Systems, Inc. (http://www.citrix.com/English/ne/news/news.asp?newsID=2304355).
Author Unknown, "HP Web Jetadmin Integration into HP OpenView Network Node Manager," Feb. 2004, pp. 1-12, HP.
Author Unknown, "IEEE Standard for Local and metropolitan area networks—Virtual Bridged Local Area Networks, Amendment 5: Connectivity Fault Management," IEEE Std 802.1ag, Dec. 17, 2007, 260 pages, IEEE, New York, NY, USA.
Author Unknown, "Open vSwitch, An Open Virtual Switch," Dec. 30, 2010, 2 pages, Cisco Systems, Inc.
Author Unknown, "Single Root I/O Virtualization and Sharing Specification, Revision 1.0," Sep. 11, 2007, pp. 1-84, PCI-SIG.
Author Unknown, "VMware for Linux Networking Support," month unknown, 1999, 5 pages, VMware, Inc.
Author Unknown, "HP OpenView Enterprise Management Starter Solution," Jun. 2006, p. 1-4, Hewlett-Packard Development Company, HP.
Author Unknown, "HP OpenView Operations 8.0 for UNIX Developer's Toolkit," Month Unknown, 2004, pp. 1-4, Hewlett-Packard Development Company, HP.
Author Unknown, "Intel 82599 10 Gigabit Ethernet Controller: Datasheet, Revision: 2.73," Dec. 2011, 930 pages, Intel Corporation.
Author Unknown, "Introduction to VMware Infrastructure: ESX Server 3.5, ESX Server 3i version 3.5, VirtualCenter 2.5," Dec. 2007, pp. 1-46, Revision: Dec. 13, 2007, VMware, Inc., Palo Alto, California, USA.
Author Unknown, "OpenFlow Switch Specification, Version 0.9.0 (Wire Protocol 0x98)," Jul. 20, 2009, pp. 1-36, Open Networking Foundation.
Author Unknown, OpenFlow Switch Specification, Version 1.0.0 (Wire Protocol 0x01), Dec. 31, 2009, pp. 1-42, Open Networking Foundation.
Author Unknown, "Private Network-Network Interface Specification Version 1.1 (PNNI 1.1)," The ATM Forum Technical Committee, Apr. 2002, 536 pages, The ATM Forum.
Author Unknown, "Virtual Machine Device Queues," White Paper, Month Unknown, 2007, pp. 1-4, Intel Corporation.
Ballani, Hitesh, et al., "Making Routers Last Longer with ViAggre," NSDI'09: 6th USENIX Symposium on Networked Systems Design and Implementation, Apr. 2009, pp. 453-466, USENIX Association.
Barham, Paul, et al., "Xen and the Art of Virtualization," Oct. 19-22, 2003, pp. 1-14, SOSP'03, Bolton Landing New York, USA.
Bavier, Andy, et. al., "In VINI Veritas: Realistic and Controlled Network Experimentation," SIGCOMM'06, Sep. 2006, pp. 1-14, Pisa, Italy.
Berde, Pankaj, et al., "ONOS Open Network Operating System An Open-Source Distributed SDN OS," Dec. 19, 2013, 34 pages.
Bhatia, Sapan, et al., "Trellis: A Platform for Building Flexible, Fast Virtual Networks on Commodity Hardware," ROADS'08, Dec. 9, 2008, pp. 1-6, Madrid, Spain, ACM.
Caesar, Matthew, et al., "Design and Implementation of a Routing Control Platform," NSDI '05: 2nd Symposium on Networked Systems Design & Implementation, Apr. 2005, pp. 15-28, Usenix Association.
Cai, Zheng, et al., "The Preliminary Design and Implementation of the Maestro Network Control Platform," Oct. 1, 2008, pp. 1-17, NSF.
Casado, Martin, et al. "Ethane: Taking Control of the Enterprise," SIGCOMM'07, Aug. 27-31, 2007, pp. 1-12, ACM, Kyoto, Japan.
Casado, Martin, et al., "Rethinking Packet Forwarding Hardware," month unknown, 2008, pp. 1-6.
Casado, Martin, et al., "SANE: A Protection Architecture for Enterprise Networks," Proceedings of the 15th USENIX Security Symposium, Jul. 31, 2006, pp. 137-151.
Casado, Martin, et al., "Scaling Out: Network Virtualization Revisited," month unknown, 2010, pp. 1-8.

(56) References Cited

OTHER PUBLICATIONS

Casado, Martin, et al., "Virtualizing the Network Forwarding Plane," Dec. 2010, pp. 1-6.
Congdon, Paul, "Virtual Ethernet Port Aggregator Standards body Discussion," Nov. 10, 2008, pp. 1-26, HP.
Das, Saurav, et al. "Simple Unified Control for Packet and Circuit Networks," Month Unknown, 2009, pp. 147-148, IEEE.
Das, Saurav, et al., "Unifying Packet and Circuit Switched Networks with OpenFlow," Dec. 7, 2009, 10 pages.
Davie, B., et al., "A Stateless Transport Tunneling Protocol for Network Virtualization (STT)," Mar. 5, 2012, pp. 1-19, Nicira Networks, Inc., available at http://tools.ietf.org/html/draft-davie-stt-01.
Davoli, Renzo, "VDE: Virtual Distributed Ethernet," Feb. 2005, pp. 1-8, Tridentcom'05, IEEE Computer Society.
Dixon, Colin, et al., "An End to the Middle," Proceedings of the 12th conference on Hot topics in operating systems USENIX Association, May 2009, pp. 1-5, Berkeley, CA, USA.
Dobrescu, Mihai, et al., "RouteBricks: Exploiting Parallelism To Scale Software Routers," SOSP'09, Proceedings of the ACM SIGOPS 22nd Symposium on Operating Systems Principles, Oct. 2009, pp. 1-17, ACM New York, NY.
Dumitriu, Dan Mihai, et al. U.S. Appl. No. 61/514,990, filed Aug. 4, 2011.
Enns, R., "NETCONF Configuration Protocol," Dec. 2006, pp. 1-96, IETF Trust (RFC 4741).
Farinacci, D., et al., "Generic Routing Encapsulation (GRE)," Mar. 2000, pp. 1-9, The Internet Society (RFC 2784).
Farrel, A., "A Path Computation Element (PCE)—Based Architecture," Aug. 2006, pp. 1-41.
Fischer, Anna, "[Patch][RFC] net/bridge: add basic VEPA support," Jun. 2009, pp. 1-5, GMANE Org.
Foster, Nate, et al., "Frenetic: A Network Programming Language," ICFP, Sep. 19-21, 2011, 13 pages, Tokyo, Japan.
Greenberg, Albert, et al., "A Clean Slate 4D Approach to Network Control and Management," Oct. 2005, 12 pages, vol. 35, No. 5, ACM SIGCOMM Computer Communication Review.
Greenberg, Albert, et al., "VL2: A Scalable and Flexible Data Center Network," SIGCOMM'09, Aug. 17-21, 2009, pp. 51-62, ACM, Barcelona, Spain.
Greenhalgh, Adam, et al., "Flow Processing and The Rise of Commodity Network Hardware," Apr. 2009, pp. 21-26, vol. 39, No. 2, ACM SIGCOMM Computer Communication Review.
Gude, Natasha, et al., "NOX: Towards an Operating System for Networks," Jul. 2008, pp. 105-110, vol. 38, No. 3, ACM SIGCOMM Computer Communication Review.
Guo, Chanxiong, et al., "BCube: A High Performance, Server-centric Network Architecture for Modular Data Centers," SIGCOMM'09, Aug. 17-21, 2009, 12 pages, ACM, Barcelona, Spain.
Hamilton, James, et al., "Datacenter Networks Are In My Way," Principals of Amazon Series, Oct. 28, 2010, pp. 1-14.
Handley, Mark, et al., "Designing Extensible IP Router Software," Proc. Of NSDI, May 2005, 14 pages.
Handley, Mark, et al., "XORP: An Open Platform for Network Research," First Workshop on Hot Topics in Networks, Princeton, New Jersey, Oct. 22-29, 2002, pp. 1-5, International Computer Science Institute, Center for Internet Research, Berkeley, California, USA.
Hinrichs, Timothy L., et al., "Practical Declarative Network Management," WREN'09, Aug. 21, 2009, pp. 1-10, Barcelona, Spain.
Ioannidis, Sotiris, et al., "Implementing a Distributed Firewall," CCS'00, Month Unknown, 2000, pp. 1-10, ACM, Athens, Greece.
Joseph, Dilip Antony, et al., "A Policy-aware Switching Layer for Date Centers," Jun. 24, 2008, 26 pages, Electrical Engineering and Computer Sciences, University of California, Berkeley, CA, USA.
Kamath, Daya, et. al., "Edge virtual Bridge Proposal, Version 0. Rev. 0.1," Apr. 23, 2010, pp. 1-72, IEEE.
Keller, Eric, et al., "The 'Platform as a Service' Model for Networking," month unknown, 2010, pp. 1-6.

Kim, Changhoon, et al., "Floodless in Seattle: A Scalable Ethernet Architecture for Large Enterprises," SIGCOMM'08, Aug. 17-22, 2008, pp. 3-14, ACM, Seattle, Washington, USA.
Kim, Chnaghoon, et al., "Revisiting Route Caching: The World Should be Flat," in Proc. Of PAM, Month Unknown, 10 pages.
Kohler, Eddie, et al., "The Click Modular Router," ACM Trans. On Computer Systems, Aug. 2000, pp. 1-34, vol. 18, No. 3.
Koponen, Teemu, et al., "Network Virtualization in Multi-tenant Datacenters," Technical Report TR-2013-001E, International Computer Science Institute & UC Berkeley, Aug. 2013, 22 pages, VMware, Inc., Palo Alto, CA, USA.
Koponen, Teemu, et al., "Onix: A Distributed Control Platform for Large-scale Production Networks," In Proc. OSDI, Oct. 2010, pp. 1-14.
Krishnaswamy, Umesh, et al., "ONOS Open Network Operating System—An Experimental Open-Source Distributed SDN OS," Apr. 16, 2013, 24 pages.
Lakshminarayanan, Karthik, et al., "Routing as a Service," Month Unknown, 2004, pp. 1-15, Berkeley, California.
Loo, Boon Thau, et al., "Declarative Routing: Extensible Routing with Declarative Queries," In Proc. of SIGCOMM, Aug. 21-26, 2005, 12 pages, Philadelphia, PA, USA.
Loo, Boon Thau, et al., "Implementing Declarative Overlays," In Proc. of SOSP, Oct. 2005, 16 pages. Brighton, UK.
Luo, Jianying, et al., "Prototyping Fast, Simple, Secure Switches for Ethane," Month Unknown, 2007, pp. 1-6.
Maltz, David A., et al., "Routing Design in Operational Networks: A Look from the Inside," SIGCOMM'04, Aug. 30-Sep. 3, 2004, 14 pages, ACM, Portland, Oregon, USA.
Mann, Vijay, Et al., "Crossroads: Seamless VM Mobility Across Data Centers Through Software Defined Networking," IEEE Network Operations and Management Symposium (NOMS), Apr. 16-20, 2012, pp. 88-96, IEEE, Piscataway, NJ, US.
McKeown, Nick, et al., "OpenFlow: Enabling Innovation in Campus Networks," Mar. 14, 2008, 6 pages, vol. 38, No. 2, ACM SIGCOMM.
Mogul, Jeffrey C., et al., "API Design Challenges for Open Router Platforms on Proprietary Hardware," Oct. 2008, pp. 1-6.
Mysore, Radhka Niranjan, et al., "PortLand: A Scalable Fault-Tolerant Layer 2 Data Center Network Fabric," Proc. Of SIGCOMM, Aug. 17-21, 2009, pp. 1-12, Barcelona, Spain.
Pelissier, Joe, "Network Interface Virtualization Review," Jan. 2009, pp. 1-38.
Pelissier, Joe, "VNTag 101," May 2008, pp. 1-87.
Pettit, Justin, et al., "Virtual Switching in an Era of Advanced Edges," Sep. 2010, 7 pages.
Pfaff, Ben, et al., "Extending Networking into the Virtualization Layer," Proc. Of HotNets, Oct. 2009, pp. 1-6.
Rosen, E., et al., "Applicability Statement for BGP/MPLS IP Virtual Private Networks (VPNs)," The Internet Society, RFC 4365, Feb. 2006, pp. 1-32.
Shenker, Scott, et al., "The Future of Networking, and the Past of Protocols," Dec. 2, 2011, pp. 1-30, USA.
Sherwood, Rob, et al., "Can the Production Network Be the Testbed?," Month Unknown, 2010, pp. 1-14.
Sherwood, Rob, et al., "Carving Research Slices Out of Your Production Networks with OpenFlow," ACM SIGCOMM Computer Communications Review, Jan. 2010, pp. 129-130, vol. 40, No. 1.
Sherwood, Rob, et al., "FlowVisor: A Network Virtualization Layer," Oct. 14, 2009, pp. 1-14, Openflow-TR-2009-1.
Spalink, Tammo, et al., "Building a Robust Software-Based Router Using Network Processors," Month Unknown, 2001, pp. 216-229, ACM, Banff, CA.
Tavakoli, Arsalan, et al., "Applying NOX to the Datacenter," month unknown, 2009, 6 pages, Proceedings of HotNets.
Touch, J., et al., "Transparent Interconnection of Lots of Links (TRILL): Problem and Applicability Statement," May 2009, pp. 1-17, IETF Trust, RFC 5556.
Turner, Jon, et al., "Supercharging PlanetLab—A High Performance, Multi-Application Overlay Network Platform," SIGCOMM-07, Aug. 27-31, 2007, 12 pages, ACM, Kyoto, Japan.

(56) References Cited

OTHER PUBLICATIONS

Turner, Jonathan S., "A Proposed Architecture for the GENI Backbone Platform," ANCS'06, Dec. 3-5, 2006, 10 pages, ACM, San Jose, California, USA.

Wang, Wei-Ming, et al., "Analysis and Implementation of an Open Programmable Router Based on Forwarding and Control Element Separation," Journal of Computer Science and Technology, Sep. 2008, pp. 769-779, vol. 23, No. 5.

Wang, Yi, et al., "Virtual Routers on the Move: Live Router Migration as a Network-Management Primitive," SIGCOMM 08, Aug. 17-22, 2008, 12 pages, ACM, Seattle, Washington, USA.

Yang, L., et al., "Forwarding and Control Element Separation (ForCES) Framework," Apr. 2004, pp. 1-41, The Internet Society RFC(3746).

Yu, Minlan, et al., "Scalable Flow-Based Networking with DIFANE," Aug. 2010, pp. 1-16, In Proceedings of SIGCOMM.

\* cited by examiner

LOGICAL ROUTER PROCESSING BY NETWORK CONTROLLER

BACKGROUND

In traditional physical networking, routes come in three types—connected, static, and dynamic. Connected routes are those determined automatically based on local interface information. When an interface has an address configured in a subnet, then the router has a directly connected route to that subnet. Static routes are those manually configured at the router, and dynamic routes are learned from other routers via routing protocols (e.g., BGP, OSPF, IGP, etc.). As this may result in a router being presented with multiple routes for the same IP address, routers perform various processing techniques in order to choose between these routes.

Virtual networks may also have routers, referred to as logical routers. Previous implementations of logical routers have only used connected routes, however, generated based on the IP prefix configured on the port of the logical router. Adding different types of routes to logical routers would pose the problem of requiring additional processing techniques for the logical routers, which may not be easily performed by the software forwarding elements often used to implement such logical routers.

BRIEF SUMMARY

Some embodiments provide a network control system that enables static route support for logical routers. In some embodiments, the logical router is managed by a network controller, which receives the input for a static route (e.g., through an API) and incorporates the static route into its stored state for the logical router. In order for the logical router to be implemented in a physical network managed by the network controller of some embodiments, the controller generates a routing table for the logical router and distributes the routing table to various elements in the network that implement the logical router. In some embodiments, the network controller distributes this routing table (including the static route information) as (i) flow entries distributed to managed forwarding elements and (ii) data tuples defining a routing table for a virtualized container (e.g., a namespace) that operates as a L3 gateway for communicating with external networks.

In some embodiments, the network controller that manages the logical router receives a definition of a static route through its API (e.g., as input by an administrator through a cloud management application). In addition, the controller generates routes for the logical router based on the configuration (also received through the API) of a logical network of which the logical router is a part. The logical network of some embodiments may contain logical switches that attach to the logical router, and subnets are defined for these logical switches (and thus for the logical ports of the logical router to which the logical switches attach). Based on the subnets defined for these logical ports, the network controller of some embodiments generates routes that send network addresses in the subnets to the respective interfaces. When static routes are received, the controller automatically calculates an input routing table and, from this, generates an output routing table. The routes in the output routing table are then distributed to the managed forwarding elements and L3 gateways in order to implement the logical router.

The network controller of some embodiments uses a table mapping engine to perform most of its state calculations (e.g., generating flow entries to implement logical networks, generating data tuples for logical services and routing tables for L3 gateways, etc.). However, in some embodiments, in order to convert an input set of routes into an output set of routes, the table mapping engine uses a separate route processing engine. Whereas the table mapping engine of some embodiments is implemented in a first programming language useful for performing join operations between sets of tables (e.g., datalog, nLog, etc.), the route processing engine of some embodiments is implemented in a second programming language useful for performing recursive processes and error checking (e.g., C, C++, etc.).

This route processing engine of some embodiments receives a set of routes from the table mapping engine (e.g., routes automatically generated by the table mapping engine based on the subnets to which the logical ports of the logical router connect, static routes input through the network controller API) and performs a recursive traversal process on the routes in order to identify a final logical destination for each network address range routed by the logical router. When multiple input routes provide contradictory information for a particular network address or range of addresses, the route processing engine of some embodiments determines which route has a higher priority. Some input routes may provide a next hop address rather than output port for a route. In these cases, the route processing engine recursively traverses the set of input routes until reaching a route specifying either a destination output port or a drop packet action. The route processing engine returns the set of output routes, with final actions (e.g., drop packet, send to particular output port) specified for each route.

Upon receiving the output set of routes from the route processing engine, the table mapping engine of some embodiments generates the information to distribute to the network elements (e.g., managed forwarding elements, managed gateways) in order for the network elements to implement the logical router. These may include flow entries sent to the managed forwarding elements (specifying, e.g., to forward packets with certain network addresses to certain logical ports) as well as routing table information for the gateways (e.g., data tuples defining a routing table for an IP stack operating in a namespace). In addition to flow entries that implement the logical routing table (specifying to forward packets to a particular logical port), the table mapping engine of some embodiments also generates flow entries that map the logical port to physical interfaces so that packets can be sent across the physical managed network between managed forwarding elements.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawing, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purpose of explanation, several embodiments of the invention are set forth in the following figures.

DETAILED DESCRIPTION

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments provide a network control system that enables static route support for logical routers. In some embodiments, the logical router is managed by a network controller, which receives the input for a static route (e.g., through an API) and incorporates the static route into its stored state for the logical router. In order for the logical router to be implemented in a physical network managed by the network controller of some embodiments, the controller generates a routing table for the logical router and distributes the routing table to various elements in the network that implement the logical router. In some embodiments, the network controller distributes this routing table (including the static route information) as (i) flow entries distributed to managed forwarding elements and (ii) data tuples defining a routing table for a virtualized container (e.g., a namespace) that operates as a L3 gateway for communicating with external networks.

The network controller of some embodiments uses a table mapping engine to perform most of its state calculations (e.g., generating flow entries to implement logical networks, generating data tuples for logical services and routing tables for L3 gateways, etc.). However, in some embodiments, in order to generate the routing table for distribution based on a set of input routes, the table mapping engine uses a separate route processing engine. Whereas the table mapping engine of some embodiments is implemented in a first programming language useful for performing join operations between sets of tables (e.g., datalog, nLog, etc.), the route processing engine of some embodiments is implemented in a second programming language useful for performing recursive processes and error checking (e.g., C, C++, etc.).

Figure 1:
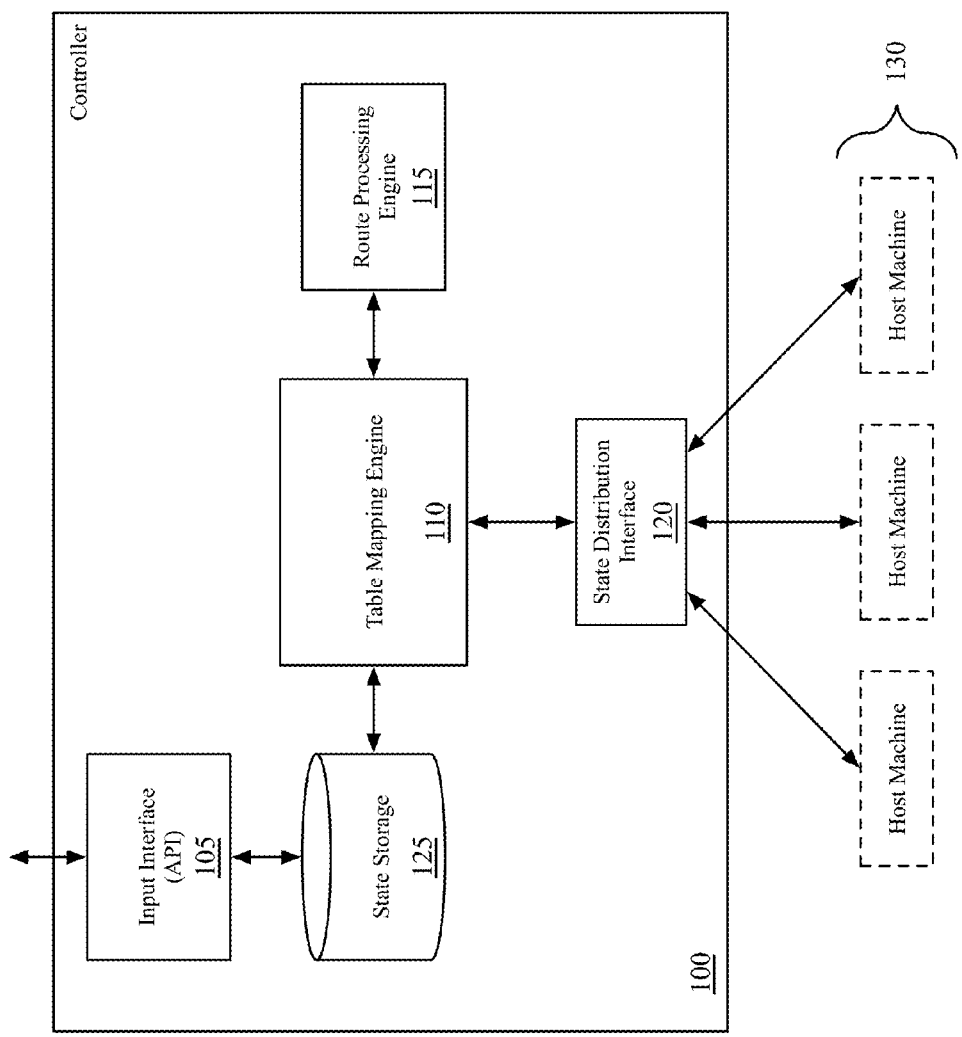
FIG. 1 conceptually illustrates the architecture of a network controller 100 of some embodiments.

FIG. 1 conceptually illustrates the architecture of such a network controller 100 of some embodiments. As shown, the network controller 100 includes an input interface (e.g., an API) 105, a table mapping engine 110, a route processing engine 115, and a state distribution interface 120. In addition, the network controller 100 includes a state storage 125. The state storage 125, in some embodiments, stores information about one or more logical networks implemented within a physical network managed by the controller 100.

In some embodiments, the network controller 100 is one of several controllers that manages numerous managed forwarding elements that implement multiple logical networks across numerous host machines. For example, a logical network might include several logical switches that attach to a logical router, with numerous virtual machines (VMs) attached to the logical switches. The VMs reside on numerous host machines, possibly alongside VMs of other logical networks. A managed forwarding element (MFE) operates on each host machine (e.g., as a software forwarding element residing in the virtualization software of the host machine) in order to process packets sent to and received from the VMs on that host machine. In some embodiments, the MFE on a particular host machine stores information in order to implement the logical forwarding elements for the various different logical networks that have VMs residing on the host machine.

The network controller 100 may manage a particular one (or several) of these logical networks, and therefore stores information in the state storage 125 about the logical forwarding elements. In some embodiments, the network controller 100 receives configuration information defining the logical network that it manages, and computes additional information for distribution to the MFEs in order to implement the logical network. The state storage 125 stores both configuration state and computed state information for all of the logical forwarding elements of the logical networks managed by the controller 100. In addition, in some embodiments, other controllers share configuration state information with the network controller 100 for other logical networks that are not managed by the controller 100. However, in some such embodiments, the controllers do not share computed state information, and each controller only computes state for the logical networks that it manages.

The input interface 105 is an application programming interface (API) in some embodiments, through which the network controller 100 receives configuration information. The configuration information may be input by an administrator logging into the network controller directly, or through a management application that translates administrator-entered information into API commands to send to the controller. In addition, the network controller 100 may receive as configuration information a definition of a static route through the input interface 105. Upon receiving this information, the input interface stores the configuration data into the state storage 125. In some embodiments, each logical forwarding element (e.g., the logical router) is stored as an object, and the routes are stored as objects which are owned by the logical router object. To define a configured route in the state storage 125, some embodiments store the type of route (e.g., connected, static), the network address or range of addresses governed by the route, a destination (e.g., a next hop address, a logical port, a drop action) for packets having a network address in the range governed by the route, and a priority for the route.

The table mapping engine 110 performs state calculations for logical networks managed by the controller 100, in some embodiments. These state calculations may include generating flow entries to implement the logical networks, generating data tuples for logical services and routing tables for L3 gateways, etc. In some embodiments, the table mapping engine is implemented in a table mapping language that performs join operations between sets of tables, such as nLog or datalog. When the table mapping engine 110 of some embodiments receives a set of routes for a logical router that includes one or more static routes (i.e., that includes routes other than those defined automatically based on the logical ports of the logical router), the table mapping engine utilizes the route processing engine 115 to translate the input set of routes into an output set of routes.

The route processing engine 115 of some embodiments receives a set of routes from the table mapping engine (e.g., routes automatically generated by the table mapping engine or network controller API based on the subnets to which the logical ports of the logical router connect, static routes input through the network controller API) and performs a recursive traversal process on the routes in order to identify a final logical destination for each network address range routed by the logical router. When multiple input routes provide contradictory information for a particular network address or range of addresses, the route processing engine 115 of some embodiments determines which route has a higher priority. Some input routes may provide a next hop address rather than output port for a route. In these cases, the route processing engine recursively traverses the set of input routes until reaching a route specifying either a destination output port or a drop packet action. The route processing engine 115 returns the set of output routes, with final actions (e.g., drop packet, send to particular output port) specified for each route. In some embodiments, the route processing engine 115 is implemented in a language different from the table mapping engine (i.e., not a table mapping language). Specifically, some embodiments implement the route processing engine in a language that is optimal for error checking and recursive traversal processes (e.g., C, C++ etc.).

Upon receiving the output set of routes from the route processing engine, the table mapping engine 110 of some embodiments generates the information to distribute to the network elements (e.g., managed forwarding elements and managed gateways residing on the host machines 130) in order for the network elements to implement the logical router. This data may include flow entries sent to the managed forwarding elements (specifying, e.g., to forward packets with certain network addresses to certain logical ports) as well as routing table information for the gateways (e.g., data tuples defining a routing table for an IP stack operating in a namespace). In addition to flow entries that implement the logical routing table (specifying to forward packets to a particular logical port), the table mapping engine 110 of some embodiments also generates flow entries that map the logical port to physical interfaces so that packets can be sent across the physical managed network between managed forwarding elements.

The controller 100 distributes the data for the logical router (and other data for, e.g., other logical forwarding elements, such as the logical switches of the logical network) generated by the table mapping engine 110 to the host machines 130 via the state distribution interface 120. In some embodiments, the controller 100 distributes the data through a hierarchy of other network controllers. For instance, in some embodiments, each logical network (or each logical forwarding element) is managed by a particular controller (which may also manage other logical networks), and each host machine is managed by a particular controller (which may also manage other host machines). The controller 100 computes the state (e.g., flow entries) for logical networks that it manages, and distributes this data to the various controllers that manage the host machines implementing those logical networks. In other embodiments, the state distribution interface 120 interfaces directly with the host machines 130 to distribute the data.

An example operation of the network controller 100 will now be described. In some embodiments, a user inputs a configuration for a logical network, which may include several logical switches connected to a logical router. Each logical switch connects to a logical port of the logical router, and each logical port is assigned a subnet (i.e., a range of network addresses). In addition, the user inputs at least one static route. The network controller 100 receives the configuration data (including the configuration of the static route) through the input interface 105.

Based on the received configuration data, the input interface 105 stores configuration state in the state storage 125. With respect to the logical router, the input interface stores (1) a connected route for each logical port, for routing packets with network addresses in the range specified for the logical port to that logical port, and (2) static routes as defined by the configuration data. In some embodiments, the input interface 105 also automatically defines a low-priority default route for handling packets sent to network addresses for which routes are not otherwise defined (e.g., to a logical gateway port). In other embodiments, such a default route is only defined if input by a user.

Upon detecting the change in the configuration state stored in the state storage 125, the table mapping engine 110 begins generating new data tuples for distribution to the host machines in order to implement the logical network. However, because static routes are defined, the table mapping engine 110 offloads the route traversal to the route processing engine 115. Specifically, the table mapping engine 110 sends to the route processing engine 120 an input set of routes (i.e., those defined by the configuration state)

The route processing engine 115 generates an output set of routes from the received set of input routes. Specifically, the route processing engine identifies routes that are not in use (e.g., lower priority routes that are superseded by higher priority routes for the same set of network addresses), and recursively traverses the set of routes to identify a final action for each set of network addresses (e.g., a drop packet action, a final output port to which to send packets). The route processing engine 115 returns the final route information to the table mapping engine 110.

The table mapping engine 110 uses the final route information to generate flow entries and/or data tuples defining the implementation of the logical router for the host machines 130. The table mapping engine 110 provides these generated data tuples to the state distribution interface 120 for distribution to the host machines 130 (e.g., directly to the host machines, through a hierarchical network control system, etc.).

The above description introduces the network controller of some embodiments for managing logical routers with static routing. Several more detailed embodiments are described below. First, Section I introduces the implementation and configuration of logical networks via a network control system of some embodiments. Section II then describes the configuration of static routes for a logical router, and Section III describes the operation of the route processing engine in a controller according to some embodiments. Finally, Section IV describes an electronic system with which some embodiments of the invention are implemented.

I. Provisioning of Logical Networks

In some embodiments, the network controllers (e.g., the controller described above by reference to FIG. 1) are part of a network control system used to manage numerous logical networks implemented in a physical managed network (e.g., a private datacenter such as an enterprise site, a public datacenter, etc.). In such a managed network, different tenants configure different logical networks, which the network control system implements in a virtualized fashion over the same physical network, while maintaining isolation between the logical networks.

Figure 2:
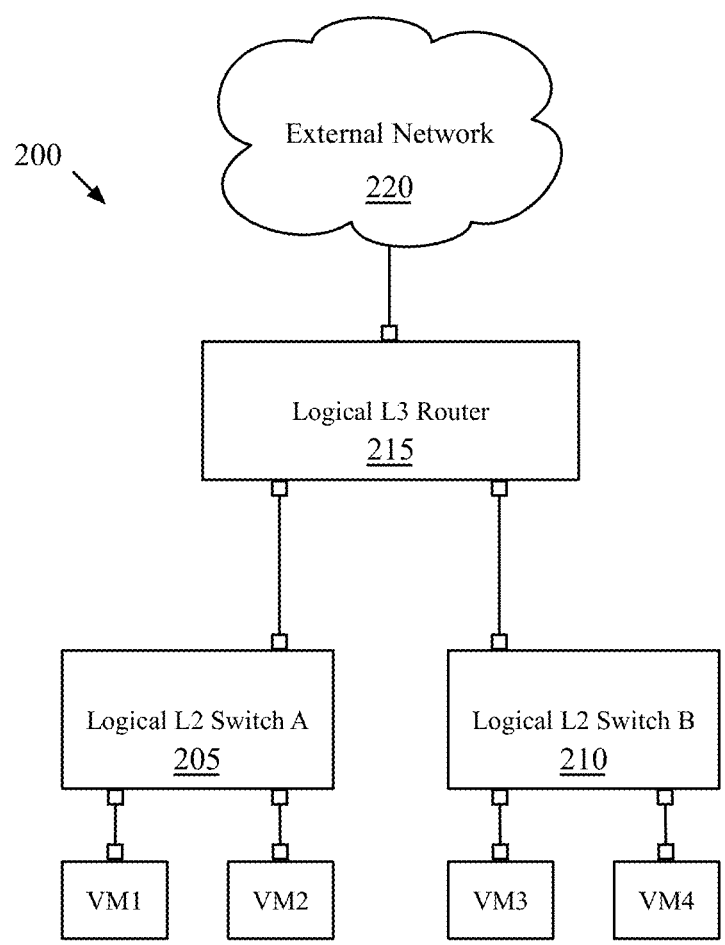
FIG. 2 conceptually illustrates a logical network architecture of some embodiments that includes a logical router.

FIG. 2 conceptually illustrates an example logical network architecture 200. The logical network 200 includes two logical switches 205 and 210 and a logical router 215. Each of the logical switches 205 and 210 connects several virtual machines (in this case, two virtual machines (VMs) are connected by each logical switch, though many networks will have far more VMs attached to each logical switch), and the logical router 215 connects the two logical switches (i.e., logical layer 2 domains) together. In addition, the logical router 215 connects the logical network to an external network 220. While in this example, the logical router 215 has a single port connecting to the external network, in some embodiments the logical router may have several uplink ports to connect to the external networks.

In some embodiments, the logical network is an abstract conception of a network generated by an administrator, and the logical network is implemented in a virtualized, distributed manner in a managed physical infrastructure (e.g., in a multi-tenant datacenter). That is, the virtual machines that connect to the logical switches may reside on various different host machines within the infrastructure, and physical managed forwarding elements (e.g., software virtual switches) operating on these host machines implement some or all of the logical forwarding elements (logical switches, logical routers, etc.).

A logical router, as in this example, connects a set of logical switches to which virtual machines logically attach. Each logical switch (or each logical port of the logical router to which a logical switch attaches) represents a particular set of IP addresses (i.e., a subnet), and is implemented in the managed network across a set of managed forwarding elements (MFEs) to which the virtual machines physically connect (e.g., through virtual interfaces). In some embodiments, the logical routers are implemented in a centralized manner (e.g., in one or more redundant gateways), rather than distributed across the MFEs with the logical switches. In other embodiments, the logical routers are implemented in a distributed fashion as well by the MFEs that connect to the virtual machines. However, when the logical router also connects to the external network via one or more ports, these connections to the external network are implemented through the use of one or more gateways. The gateways, in some embodiments, are responsible for both sending data traffic from the managed network to the external unmanaged physical network and processing traffic sent from the external network into the managed network.

Figure 3:
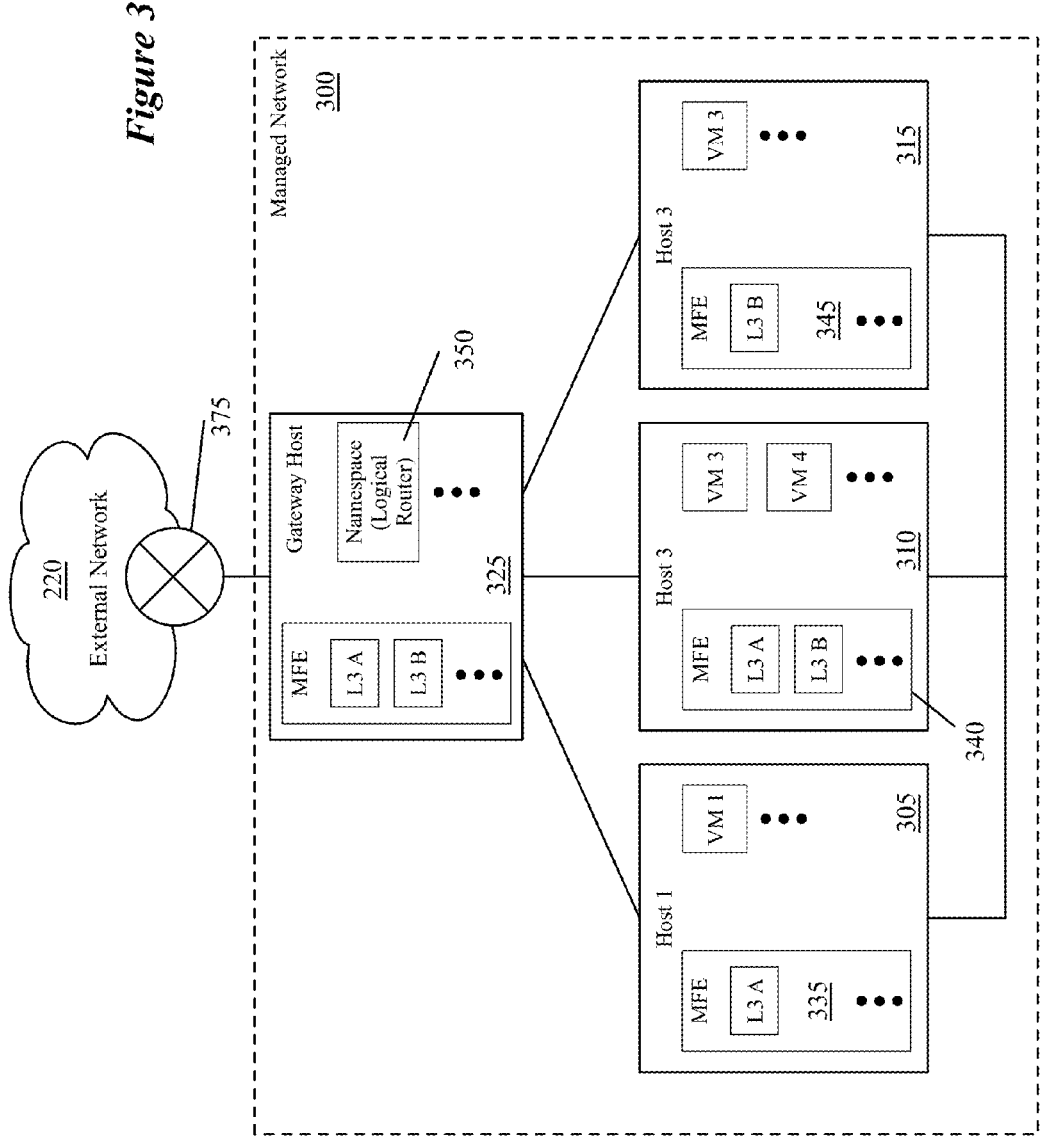
FIG. 3 illustrates a centralized logical router implementation of the logical network of FIG. 2 in a managed network of some embodiments.
Figure 4:
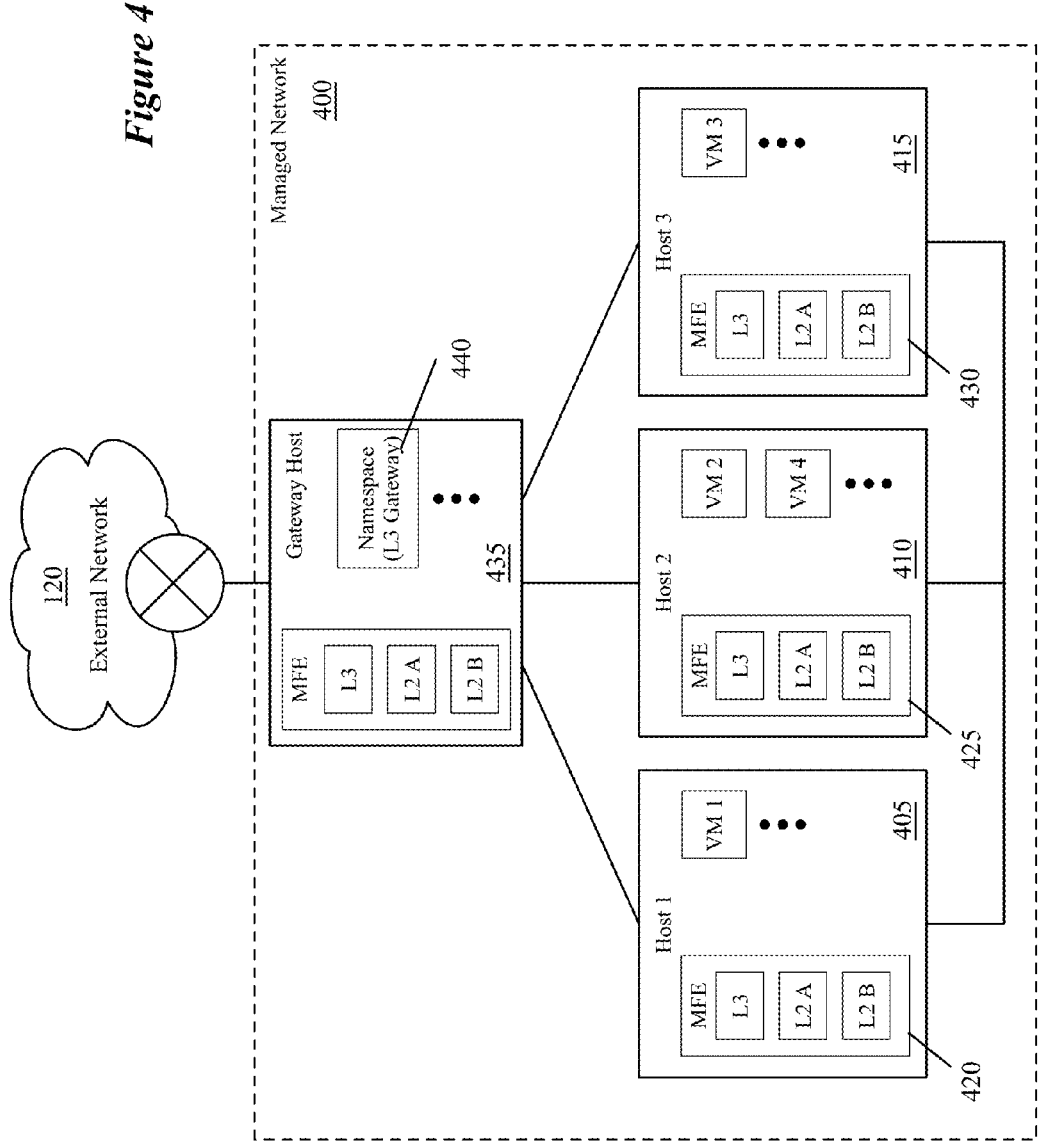
FIG. 4 illustrates a distributed logical router implementation of the logical network of FIG. 2 in a managed network of some embodiments.

FIGS. 3 and 4 conceptually illustrate two different implementations for the logical network 200, depending on whether the logical router is implemented in a centralized or distributed fashion. FIG. 3 illustrates a centralized logical router implementation in a managed network 300 of some embodiments. In this case, a gateway host machine implements the entire routing table of the logical router 215. The gateway host has a connection outside the managed network to at least one physical router 375 that is part of the external network 220. While shown as being implemented in a single gateway host, some embodiments in fact implement the logical router in a high-availability manner, with one active gateway and at least one standby gateway. The high-availability gateways for logical routers are described greater detail in U.S. application Ser. No. 14/166,446, filed Jan. 28, 2014, entitled "High Availability L3 Gateways for Logical Networks", and published as U.S. Patent Application Publication No. 2015/0063360, which is incorporated herein by reference.

As shown, the physical infrastructure of the managed network 300 includes three host machines 305-315 for hosting virtual machines, and a gateway host machine 325. The VMs of the logical network 200 reside on the hosts 305-315, implemented on top of virtualization software (e.g., a hypervisor, virtual machine monitor, etc.) that operates in the host. Additional virtual machines that connect to other logical networks may also reside on some or all of these hosts 305-315 in the physical infrastructure of the managed network, as well as on other hosts (not shown in this figure).

In addition to the virtual machines, each of the hosts 305-315 operates a managed forwarding element (MFE) 335-345. In some embodiments, this MFE is a software virtual switch that operates within the virtualization software of the host (e.g., Open vSwitch, or another software forwarding element). In the implementation illustrated in FIG. 3, the managed forwarding elements in the hosts 305-315 implement the logical switches 205 and 210. As shown, because only VM 1 resides on the first host 305, only the logical switch 205 to which this VM connects is implemented by the MFE 335 (though other logical switches for other logical networks may also be implemented by the MFE). Similarly, the MFE 345 only implements the second logical switch 210, while the MFE 340 implements both logical switches 205 and 210. In other embodiments, each of these MFEs 335-345 implements both logical switches.

In this centralized implementation of the logical network 200, none of the MFEs 335-345 that run in the VM hosts 305-315 implement the logical router 215. Instead, the entire routing table of the logical router resides in the gateway host 325. As shown, a namespace 350 (or other virtualized container) operates on the gateway host in order to implement the logical router 215. When one of the MFEs 335-345 determines that a packet sent by one of the VMs of the logical network 200 requires logical router processing, the MFE sends the packet to the logical router implemented by the namespace 350. Some embodiments utilize tunnels between the MFEs 335-345 and the MFE 355 located in the gateway host 325. In some embodiments, the MFEs 335-345 are provisioned such that when a packet is logically forwarded to a logical router, the MFE encapsulates the packet in a tunnel to the MFE 355 operating on the gateway host 325. As mentioned, some embodiments implement the logical router 215 in several gateway hosts, with one host active. In this case, the MFEs 305-315 send packets to the active host unless that tunnel is down, in which case the MFEs send the packets to one of the standby hosts.

In other embodiments, the managed forwarding elements in the VM host machines implement the logical router in a distributed manner, with the logical routers implemented in the gateways only functioning to process packets sent from machines in the managed network to destinations outside the managed network and to process packets sent from sources outside the managed network to machines in the managed network. FIG. 4 conceptually illustrates such a distributed implementation in a managed network 400. In this case, a namespace operating in a gateway host machine only implements the routing table for packets entering or egressing the managed network, rather than the entire routing table for the logical router 215.

As in the previous figure, the portion of the physical infrastructure of the managed network 400 that implements the logical network 200 includes three host machines 405-415 for hosting virtual machines and a gateway host machine 435 that hosts a L3 gateway in a namespace 440. In this case, the managed forwarding elements 420-430 that operate on the hosts 405-415 (e.g., within the virtualization software of these hosts) not only implement the logical switches 205 and 210, but also the logical router 215. This enables first-hop logical processing in some embodiments, in which all or most of the logical processing for a packet is performed at the first MFE that receives the packet. Thus, a packet sent from VM 1 to VM 4 would be processed, at the MFE 420, through logical switch 205 to logical router 215 and then to logical switch 210. The MFE 420 would identify the logical egress port of logical switch 210 for the packet as the port to which VM 4 attaches, and map this egress port to a tunnel to the MFE 425 at host 410.

However, for traffic sent to an external destination (i.e., not connected to either logical switch), the MFE identifies a logical egress port of the logical router as the port that connects to the external network. The MFE then sends this traffic to the gateway host 435 on which the L3 gateway is implemented (i.e., the north-south routing portion of the routing table, for packet sent into and out of the managed network). As in the centralized embodiments, in some embodiments the L3 gateway is implemented with one active gateway and one or more standby gateways.

As described above, these MFEs and gateways are provisioned, in some embodiments, by a network control system. One or more network controllers in the network control system receive the network configuration input by a user/administrator and convert this information into flow entries and/or data tuples that can be used by the MFEs and gateway host machines, and distributes the data tuples to the host machines.

Figure 5:
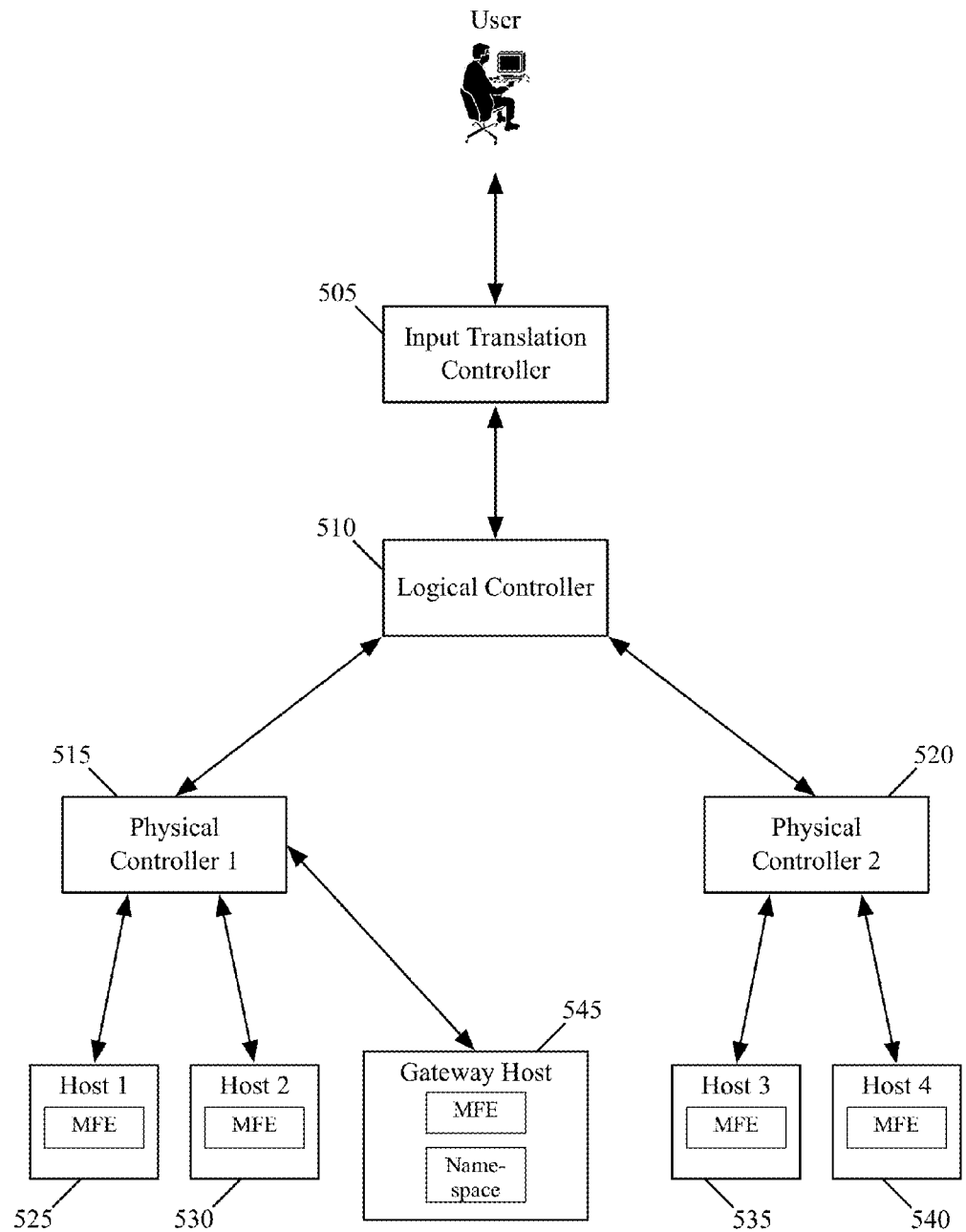
FIG. 5 conceptually illustrates a network control system of some embodiments for provisioning managed forwarding elements and L3 gateways in order to implement logical networks.

FIG. 5 conceptually illustrates such a network control system 500 of some embodiments for provisioning managed forwarding elements and L3 gateways (whether these gateways implement an entire logical router routing table or only the network ingress/egress portion of the routing table) in order to implement logical networks. As shown, the network control system 500 includes an input translation controller 505, a logical controller 510, physical controllers 515 and 520, host machines 525-540, and a gateway host machine 545. As shown, the hosts 525-540, as well as the gateway host 545, include managed forwarding elements, which may implement logical forwarding elements as shown in the above figures. The gateway host 545 also includes a namespace, which implements at least a portion of a routing table for a logical router of the managed network. One of ordinary skill in the art will recognize that many other different combinations of the various controllers and hosts are possible for the network control system 500.

In some embodiments, each of the controllers in a network control system is a computer (e.g., with an x86-based processor) with the capability to function as an input translation controller, logical controller, and/or physical controller. Alternatively, in some embodiments a given controller may only have the functionality to operate as a particular one of the types of controller (e.g., as a physical controller). In addition, different combinations of controllers may run in the same physical machine. For instance, the input translation controller 505 and the logical controller 510 may run in the same computing device, with which a data center management application interacts (or with which an administrator interacts directly).

The input translation controller 505 of some embodiments includes an input translation application that translates network configuration information received from a user. While shown as receiving the information directly from the user in FIG. 5, in some embodiments a user interacts with a data center management application, which in turn passes the network configuration information to the input translation controller.

For example, a user may specify a network topology such as that shown in FIG. 2. For each of the logical switches, the user specifies the machines that connect to the logical switch (i.e., to which logical ports of the logical switch the VMs are assigned). The user may also specify which logical switches attach to any logical routers, a logical port of the logical router for connection to external networks, and any configuration details for the logical router. The input translation controller 505 translates the received network topology into logical control plane data that describes the network topology as a set of data tuples in some embodiments. For example, an entry might state that a particular MAC address A is located at a first logical port X of a particular logical switch, that a logical router Q is located at a second logical port Y of the particular logical switch, or that a logical port G of the logical router Q is a gateway port to an external network.

In some embodiments, each logical network is governed by a particular logical controller (e.g., logical controller 510). The logical controller 510 of some embodiments translates the logical control plane data that defines the logical network and the logical forwarding elements (e.g., logical routers, logical switches) that make up the logical network into logical forwarding plane data, and the logical forwarding plane data into physical control plane data. The logical forwarding plane data, in some embodiments, consists of flow entries described at a logical level. For the MAC address A at logical port X, logical forwarding plane data might include a flow entry specifying that if the destination of a packet matches MAC A, to forward the packet to port X. The port of the logical router Q will also have a MAC address, and similar flow entries are created for forwarding packets with this MAC address to port Y of the logical switch. Similarly, for a logical router with a port K to which a logical switch having a range of IP addresses C1-C24, the logical forwarding plane data might include a flow entry specifying that if the destination of a packet matches IP C1-C24, to forward the packet to port K.

In some embodiments, the logical controller translates the logical forwarding plane data into universal physical control plane data. The universal physical control plane data enables the network control system of some embodiments to scale even when the network includes a large number of managed forwarding elements (e.g., hundreds, thousands) to implement a logical forwarding element, and when the network implements a large number of logical networks. The universal physical control plane abstracts common characteristics of different MFEs in order to express physical control plane data without considering differences in the MFEs and/or location specifics of the MFEs.

As stated, the logical controller 510 of some embodiments translates logical control plane data into logical forwarding plane data (e.g., logical flow entries that include a match over logical network parameters, such as logical addresses, logical ingress ports, etc.), then translates the logical forwarding plane data into universal physical control plane data. In some embodiments, the logical controller application stack includes a control application for performing the first translation and a virtualization application for performing the second translation. Both of these applications, in some embodiments, use a rules engine for mapping a first set of tables into a second set of tables. That is, the different data planes are represented as tables (e.g., nLog tables), and the controller applications use a table mapping engine (e.g., an nLog engine) to translate between the planes (e.g., by applying join operations on the tables). The input and output tables, in some embodiments, store sets of data tuples that define the different planes of data.

In some embodiments, the logical router processing entails recursive route traversal processes and various types of error checking that are not optimally performed by the table mapping engine. Specifically, the configuration data for a logical router includes a set of input routes (analogous to the routing information base of a physical router) that must be narrowed to a set of output routes used to implement the routing table of the logical router (analogous to the forwarding information base of a physical router). In some embodiments, this set of output routes is part of the logical control plane data. In order to generate this logical control plane data for the logical router, the table mapping engine of some embodiments offloads the route processing to a separate module in the logical controller, implemented in a language better suited to such recursive and error checking/generation actions. The route processing engine returns a set of output routes that the table mapping engine incorporates into its generation of logical forwarding plane entries.

Each of the physical controllers 515 and 520 is a master of one or more managed forwarding elements (e.g., located within host machines). In this example, each of the two physical controllers is a master of two managed forwarding elements located at the VM host machines 525-540. Furthermore, the physical controller 515 is a master of two gateway hosts 545 and 550, which host MFEs as well as the active and standby logical routers for a particular logical network. In some embodiments, the active and standby hosts for a logical router are managed by the same physical controller (as in this figure), while in other embodiments separate physical controllers manage the different gateway hosts of a logical network.

In some embodiments, a physical controller receives the universal physical control plane data for a logical network and translates this data into customized physical control plane data for the particular MFEs that the physical controller manages and which require data for the particular logical network. In other embodiments, the physical controller passes the appropriate universal physical control plane data to the MFEs, which have the ability (e.g., in the form of a chassis controller running on the host machine) to perform this conversion themselves.

The universal physical control plane to customized physical control plane translation involves a customization of various data in the flow entries. For the first example noted above, the universal physical control plane would involve several flow entries (i.e., several data tuples). The first entry states that if a packet matches the particular logical data path set (e.g., based on the packet being received at a particular physical ingress port), and the destination address matches MAC A, then forward the packet to logical port X. This entry will be the same in the universal and customized physical control planes, in some embodiments. Additional entries are generated to match a physical ingress port (e.g., a virtual interface of the host machine) to the logical ingress port X (for packets received from the VM having MAC A), as well as to match a destination logical port X to the physical egress port of the physical MFE (e.g., again the virtual interface of the host machine). However, these physical ingress and egress ports are specific to the host machine on which the MFE operates. As such, the universal physical control plane entries include abstract physical ports while the customized physical control plane entries include the actual physical interfaces (which, in many cases are virtual interfaces) of the specific MFEs.

In some embodiments, as shown, the logical router hosts also operate managed forwarding elements (e.g., using the same packet processing/virtual switching software as the VM hosts 525). These MFEs also receive physical control plane data from the physical controller that enables the MFEs to implement the logical forwarding elements. In addition, some embodiments distribute the routing table data to the namespaces operating in the gateway hosts through the hierarchical network control system. The logical controller 510 that manages the logical network selects the gateway host for the logical router in some embodiments (e.g., using a load balancing algorithm that spreads the logical routers for various logical networks across a set of hosts).

The logical controller 510 identifies the physical controller 515 that manages the selected gateway host, and distributes the routing table (as well as any other information used for layer 3 processing, such as firewall information, NAT, etc.) to the identified physical controller. In some embodiments, the routing table is distributed as a set of data tuples. The physical controller 515 then distribute these data tuples to the gateway host 545. The gateway hosts convert these data tuples into a routing table for use by a container (e.g., a VM, a namespace) that operates on the gateway host as a logical router or L3 gateway.

Figure 6:
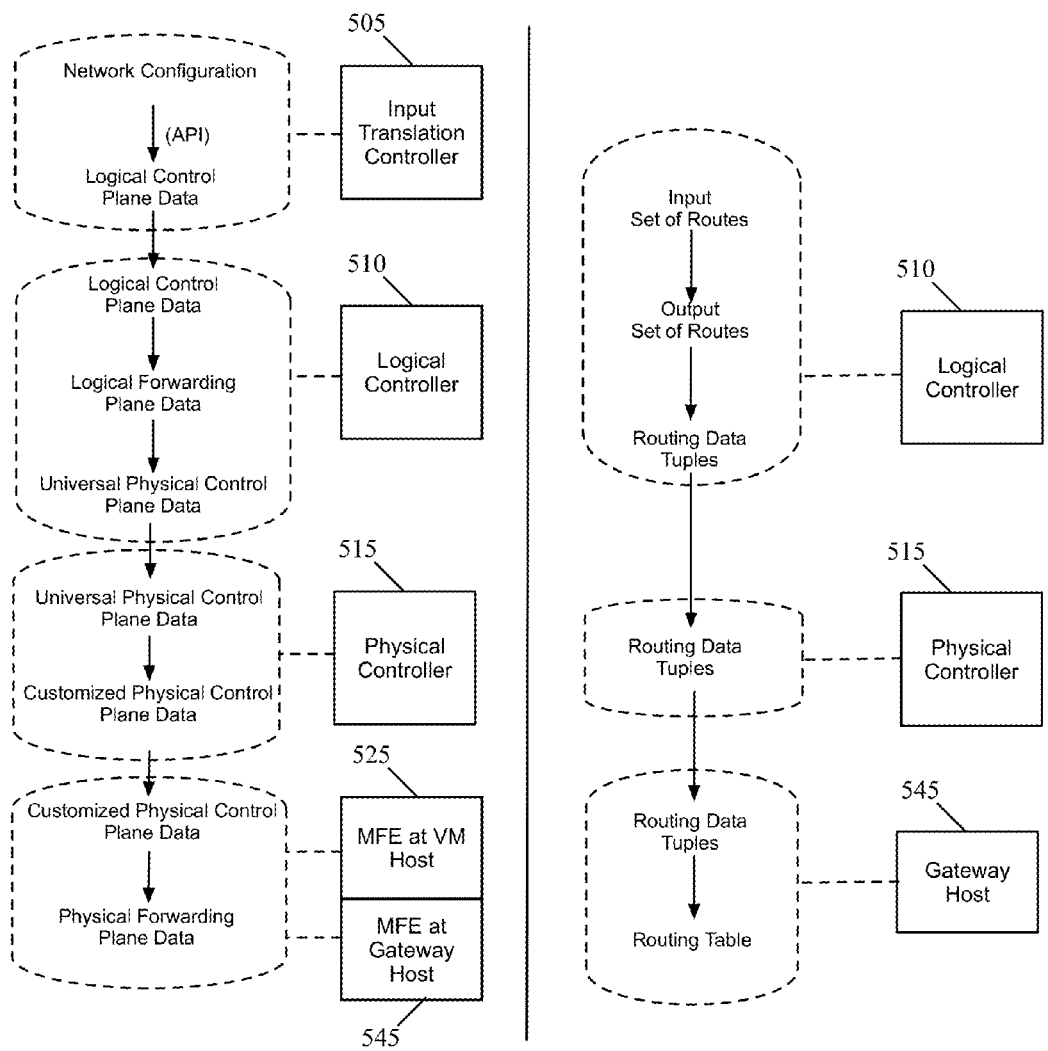
FIG. 6 conceptually illustrates the propagation of data through the hierarchical network control system of some embodiments.

The above describes the hierarchical network control system of some embodiments, although the network control system of other embodiments includes only a single controller (or a controller cluster with one active and one or more standby controllers). FIG. 6 conceptually illustrates the propagation of data through the hierarchical network control system of some embodiments. The left side of this figure shows the data flow to the managed forwarding elements to implement the logical forwarding elements (either the logical switches, or the logical switches and logical routers) of the logical network, while the right side of the figure shows the propagation of routing table data to the gateway hosts in order to provision the logical routers (either the entire logical router or only the gateway logical router functionality).

On the left side, the input translation controller 505 receives a network configuration through an API, which is converted into logical control plane data. This network configuration data includes a logical topology such as that shown in FIG. 2. In some embodiments, the network configuration may also include the specification of one or more static routes for a logical router. The network configuration specifies attachments of logical switches to logical routers in some embodiments, with MAC addresses assigned to each logical router port that connects to a logical switch, and each logical switch having an associated IP subnet.

As shown, the logical control plane data is converted by the logical controller 510 (specifically, by a control application of the logical controller) to logical forwarding plane data, and then subsequently (by a virtualization application of the logical controller) to universal physical control plane data. In some embodiments, these conversions generate a flow entry at the logical forwarding plane (or a data tuple that defines a flow entry), then add a match over the logical data path set (e.g., the logical switch or router) at the universal physical control plane. The universal physical control plane also includes additional flow entries (or data tuples) for mapping generic physical ingress ports (i.e., a generic abstraction of a port not specific to any particular MFE) to logical ingress ports as well as for mapping logical egress ports to generic physical egress ports. For instance, for forwarding a packet to a logical router, the flow entries at the universal physical control plane for a logical switch would include a forwarding decision to send a packet to the logical port to which the logical router connects when the destination MAC address matches that of the logical router port.

In addition, for the centralized logical router, the universal physical control plane entries would include a mapping of the logical port to a generic physical port of a host machine that connects to the gateway host on which the logical router resides, and generic tunneling entries for encapsulating the packet in a tunnel to the gateway host. On the other hand, for the distributed logical router, the universal physical control plane entries would not send all packets destined for the logical router to the gateway, but instead include the logical router processing. Similar to the examples in the previous paragraph for the logical switch, the logical router flow entries identify a logical egress port based on a match over (i) the logical router pipeline (i.e., that the packet has been forwarded to the logical router) and (ii) the IP address. The mapping of IP address to logical port, in some embodiments, is based on the routing table generated by the route processing engine at the logical controller. For packets forwarded to a logical router port that faces the external network, the universal physical control plane additionally includes entries for mapping the logical egress port to a destination gateway and encapsulating the packet in a tunnel to the gateway.

The physical controller 515 (one of the several physical controllers in the hierarchical network control system 500), as shown, translates the universal physical control plane data into customized physical control plane data for the particular MFEs that it manages at hosts 525, 530, 545. This conversion involves substituting specific data (e.g., specific physical ports) for the generic abstractions in the universal physical control plane data. For instance, in the example of the above paragraph, the port integration entries are configured to specify the physical layer port appropriate for the particular logical router or L3 gateway connection (e.g., an actual physical port and tunnel encapsulation information for the particular host machine on which the MFE operates).

The MFE at host 525 (one of several MFEs managed by the physical controller 515) performs a translation of the customized physical control plane data into physical forwarding plane data, in some embodiments. The physical forwarding plane data, in some embodiments, are the flow entries stored within a MFE (e.g., within a software virtual switch such as Open vSwitch) against which the MFE actually matches received packets. In addition, the MFE at the gateway host 545 performs such a translation in order to forward packets between the namespace and the other network entities (e.g., VMs).

The right side of FIG. 6 illustrates data propagated to the gateway hosts (e.g., host 545) to implement a logical router (either a centralized logical router or a L3 gateway for a distributed logical router), rather than to the MFEs. As shown, the logical controller 510 receives an input set of routes, generates an output set of routes, and then translates the output set of routes into routing data tuples from these routes.

In some embodiments, the input set of routes is generated by either the logical controller or the input translation controller from the network configuration input by the user (e.g., the administrator). When a user designs the logical network (such as network 200), each logical switch has an associated IP subnet. From this, the logical controller automatically generates routes to each of these logical router ports that attach to the logical switches (e.g., if IP=10.0.0.0/24, send to Port J). In addition, when the logical router includes a gateway port to external networks the logical controller of some embodiments generates a low priority default route to send packets that do not match any other routes to the external network. The logical controller may have data in some embodiments that identifies a physical router in the external network, so that the default route sends packets to the identified router. Furthermore, users may input static routes as part of the logical network configuration. In some embodiments, the static routes specify either a logical router port or a next hop network address to which to send packets with network addresses that fall in a given range (e.g., 12.0.0.0/28).

Before calculating the flow entries or the routing data tuples for the logical router, the logical controller of some embodiments generates an output set of routes based on the input set of routes. In some embodiments, a route processor in the logical controller recursively traverses the set of input routes to identify final output actions for each set of network addresses. For instance, if the input set includes multiple routes for the same network address (or set of network addresses), the route processor identifies those with the highest priority as in use, and removes (for the purpose of creating a routing table for implementation in the network) the lower priority routes. In addition, if a route specifies to send packets to an output port that is not in use, then the route processor removes that route. For static routes that specify a next hop network address rather than an output port, the route processor traverses the set of routes (i.e., identifying the route for the specified next hop network address) until a route with either an output port or a drop action (specifying for the router to drop packets sent to the network address) is reached, then outputs the final action for the network address to the set of output routes.

In the centralized logical router implementation of some embodiments, all of the routes in the output set are converted into routing data tuples at the logical controller. This may be performed by the table mapping engine in some embodiments. In the distributed implementation, much of the output set of routes is specified as part of the logical control plane data and converted into physical control plane data (as shown on the left side of FIG. 6). In this case, the routing data tuples for distribution to the L3 gateways will still include the routes to the external physical router(s), as well as routes for processing incoming packets received via the connection with these external routers.

In addition to the routes themselves, the logical controller 510 also generates a set of data tuples that defines the logical routers. For instance, when a logical router is created, the logical controller of some embodiments selects at least one gateway host, then creates a new data tuple (i.e., a record) that specifies the new namespace (or other container) on the host for the logical router. In addition, some embodiments specify in the data tuple that routing is enabled for the namespace (as opposed to, or in addition to, other services such as DHCP).

Once the logical controller 510 creates the data tuples and identifies the gateway host (or hosts) that will receive the data tuples, the logical controller then identifies the physical controller that manages the gateway host. As mentioned, like the VM hosts 525-540, each of the gateway hosts has an assigned master physical controller. In the example of FIG. 5, the gateway host is managed by the physical controller 515, so the other physical controller 520 does not receive the logical router data tuples. In order to supply the logical router configuration data to the gateway hosts, the logical controller 510 of some embodiments pushes the data to the physical controller 515. In other embodiments, the physical controllers request the configuration data (e.g., in response to a signal that the configuration data is available) from the logical controller.

The physical controller 515 passes the data to the gateway host 545, much as it passes the physical control plane data. In some embodiments, the routing data tuples are sent to a database running on the host that is part of the software associated with the MFE, and used to configure certain aspects of the MFE (e.g., its port information and other non-flow entry configuration data). Some embodiments use a first protocol (e.g., OpenFlow) to pass the flow entries for the MFE to the hosts, while using a second protocol (e.g., OVSDB) to pass the configuration and routing table data to the hosts. The namespace or other container implementing the logical router retrieves the appropriate information from the database on its host, or has the appropriate information passed to it. In some embodiments, a process on the gateway host 545 translates the data tuples stored in the database into a routing table and other network stack data (e.g., a standard Linux network stack, including a routing table) for the namespace.

The above description describes the conversion, by the network control system, of the network configuration into a set of physical forwarding plane flow entries that the physical controller passes to the host (e.g., via a protocol such as OpenFlow). In other embodiments, however, the data for defining flow entries is passed in other forms, such as more abstract data tuples, and the MFEs or processes running on the hosts with the MFEs convert these data tuples into flow entries for use in processing data traffic.

II. Configuration of Static Routes

As indicated above, the network control system (e.g., the network controllers) of some embodiments enable administrators to configure static routes for logical routers in logical networks maintained by the administrators. These static routes are incorporated into the data structures that store state for the logical router, along with automatically-generated routes for the logical router. As such, the network control system of some embodiments generates, from the static routes (and other logical router data), flow entries and data tuples used to implement the logical router by the network elements managed by the network control system.

Figure 7:
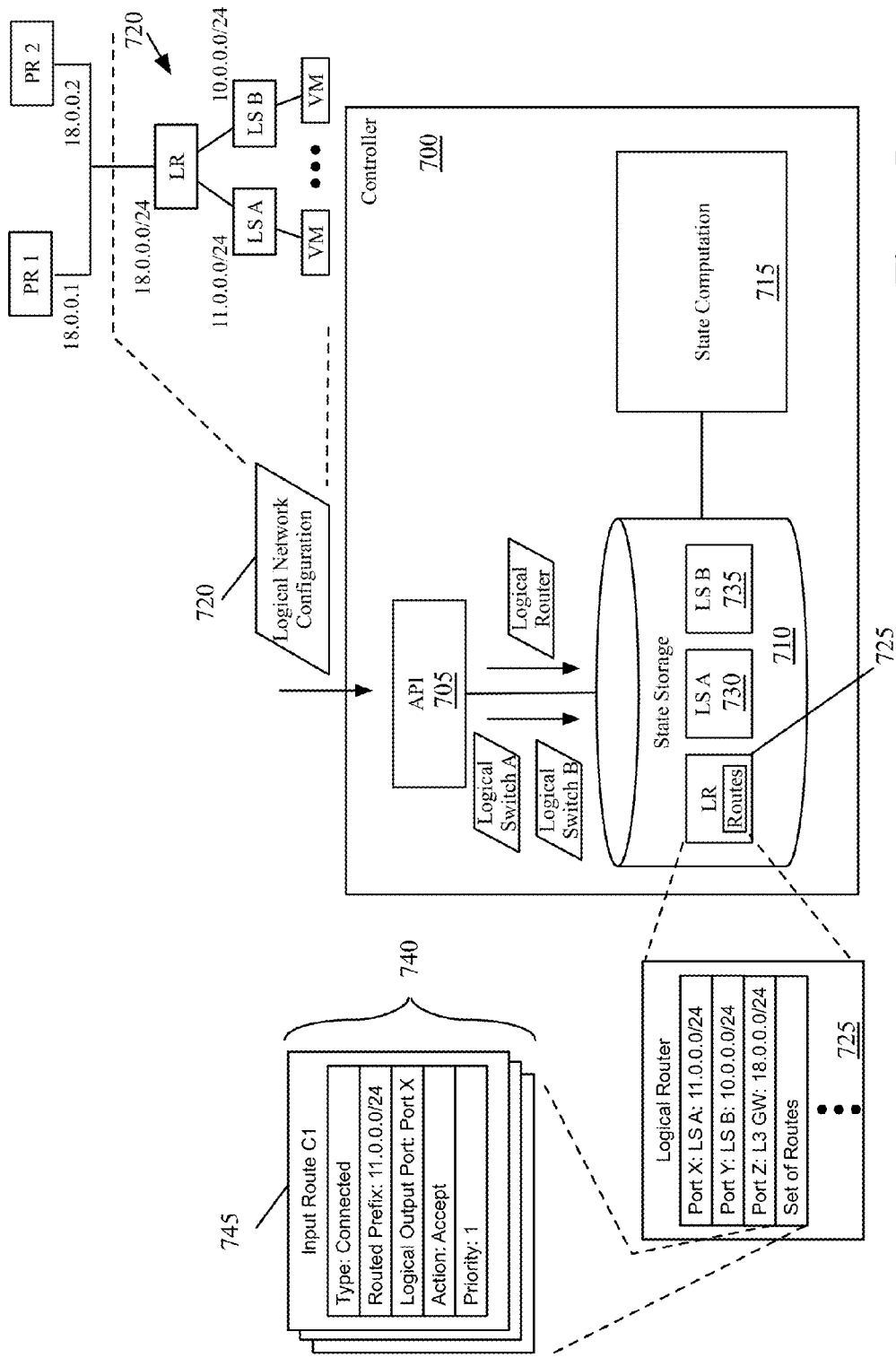
FIG. 7 conceptually illustrates the receipt of a logical network configuration by a controller.
Figure 8:
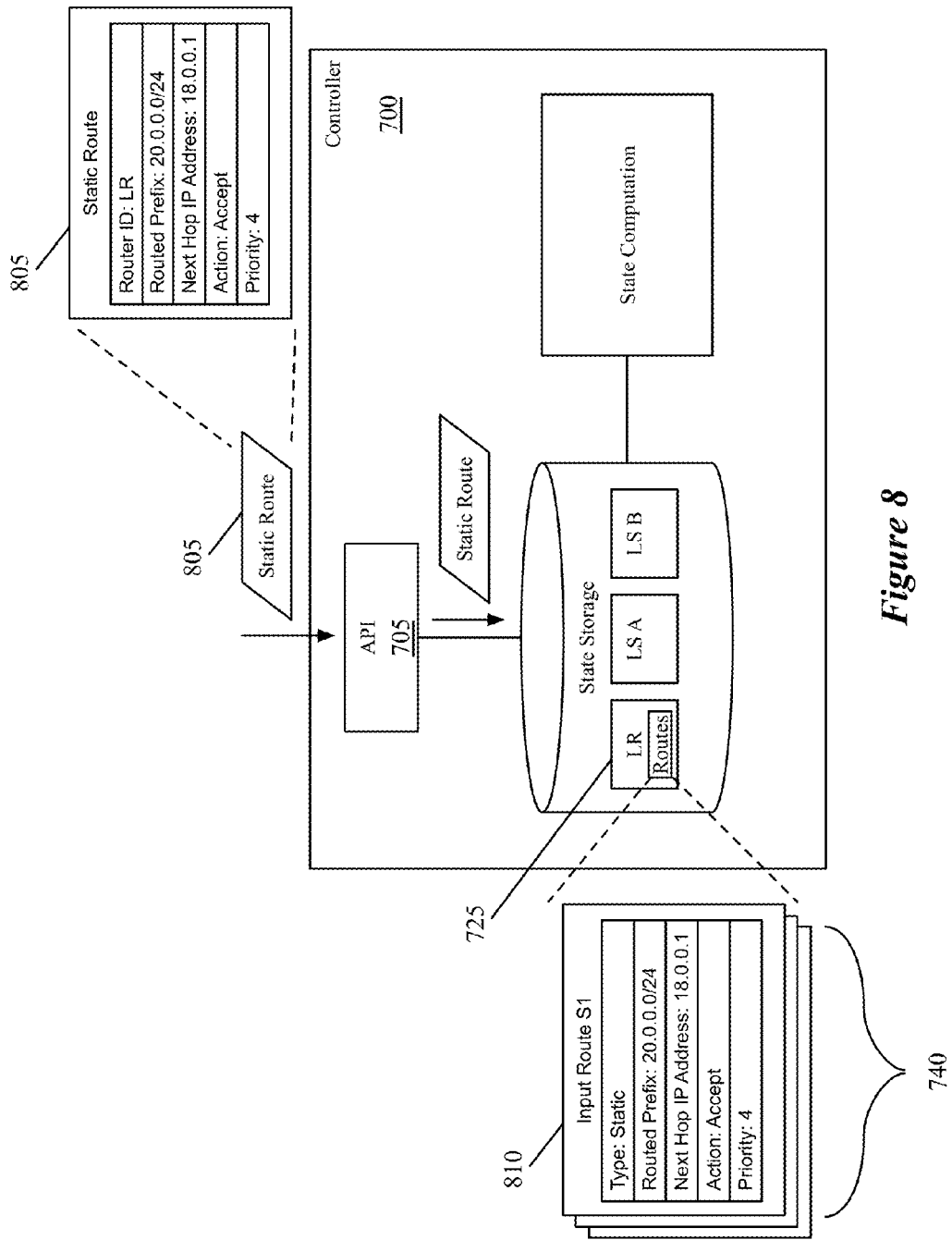
FIG. 8 conceptually illustrates the receipt by a controller of configuration data for a static route for the logical router.
Figure 9:
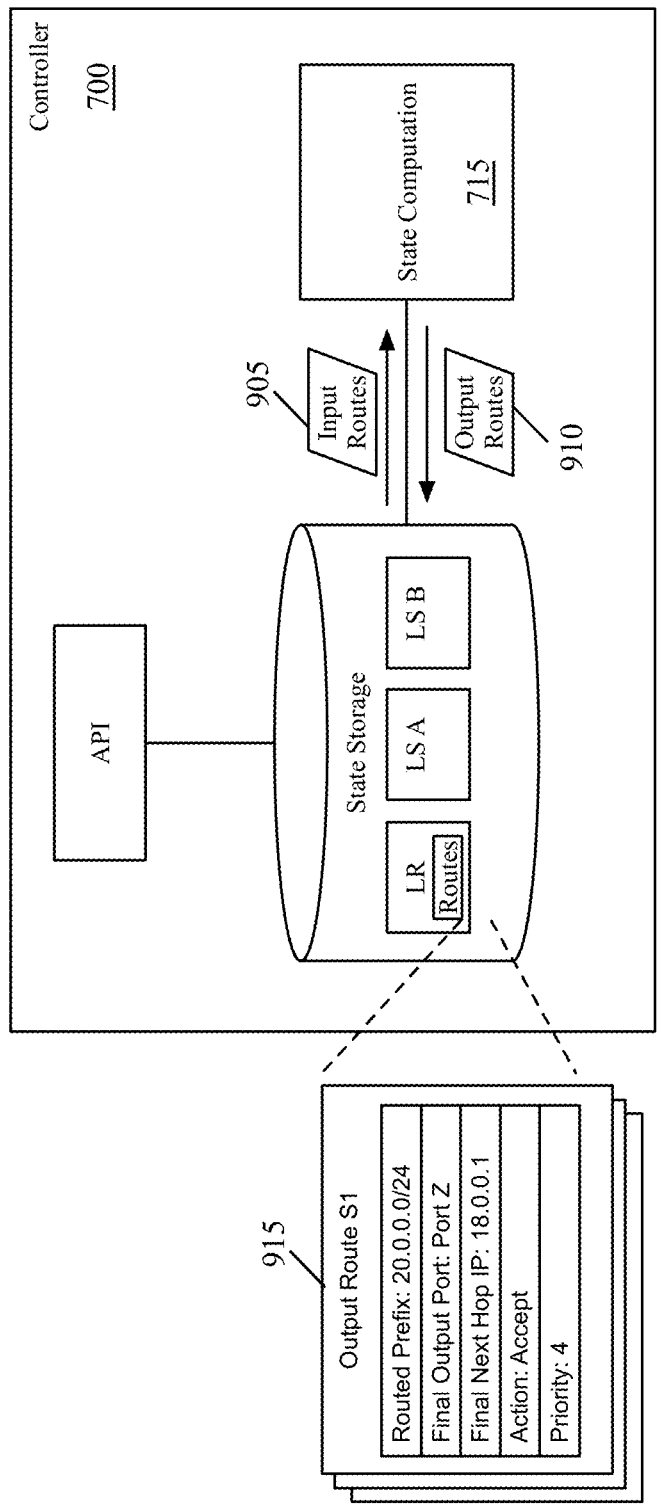
FIG. 9 conceptually illustrates computation performed by a network controller based on a static route configured for a logical router.

FIGS. 7-9 conceptually illustrate the input of a logical network configuration and static route for a logical network at a network controller 700. The controller 700, as shown, includes an API 705 for receiving configuration data, a state storage 710, and a state computation module 715.

The API 705 of some embodiments provides an interface through which the controller receives configuration state data for one or more logical networks. In some embodiments, the API 705 represents a set of methods that may be used to create, modify, delete, query, etc. logical network data in the state storage 710. In some embodiments, a network administrator may access the controller through a direct connection (e.g., by manually inputting the API calls) or through a cloud management application. In the case of a cloud management application, in some embodiments the administrator configures a logical network through a graphical interface (or other intuitive interface) of the application, which translates the data received from the user into the appropriate API calls to the controller 700.

Some such API methods for the API 705 include methods to create a logical router, create logical router ports, create a logical switch, attach a logical switch to a logical router, attach a logical port to an external network, create a static route, modify a static route, remove a static route, query a logical router for its routes, etc. These various methods, in some embodiments, enable the administrator to access or modify configuration state data stored in the state storage 710.

In some embodiments, the state storage 710 stores a set of objects that define logical networks managed by the controller 700. Based on commands received by the API 705, the controller 700 creates objects in the state storage 710. The state storage of some embodiments is a network information base (NIB) described in detail in U.S. Patent Publication No. 2013/0058356, which is incorporated herein by reference, although other embodiments use different storages for storing state information at the network controllers. In addition to storing the configuration state received through the API 705, the state storage of some embodiments also stores computed state calculated by the state computation module 715.

Furthermore, the network controller 700 may receive state information from (i) other network controllers and (ii) network elements (e.g., MFEs) through interfaces with these entities (not shown). In some embodiments, other logical controllers receive configuration state for other logical networks, and share the configuration state information with the controller 700 (e.g., through an RPC channel). In some such embodiments, the network controllers only share configuration state, and do not share computed state. This enables an administrator to input configuration data for a particular logical network into any of the network controllers, as the configuration data will be shared with the network controller that manages the particular logical network, and only that network controller will compute state for the logical network based on the input configuration state. The managed forwarding elements and namespaces hosting L3 gateways may also provide state information (e.g., regarding links that are down, the amount of traffic processed for particular logical networks, etc.) to their managing physical controller (e.g., through one of the channels used to provision the MFE or namespace). When a physical controller receives this information, in some embodiments the controller identifies the appropriate logical controller to which to provide the data, which is then stored in the state storage of the controller (e.g., storage 710).

The state computation module (or set of modules) 715 of some embodiments allows the controller to compute additional state information based on (i) the configuration state received through the API, (ii) previously computed state (e.g., in a series of computations), and (iii) state propagated upwards to the network controller from the physical managed forwarding elements. In some embodiments, the state computation module 715 is a table mapping engine (e.g., the table mapping engine described above by reference to FIG. 1). The state computation module may also include a route processing engine for recursively traversing configuration state routes to generate computed state routes. The table mapping engine of some embodiments is implemented in a first table-mapping programming language (e.g., nLog) that is optimal for performing join operations between tables, while the route processing engine of some embodiments is implemented in a second programming language (e.g., C++) that is optimal for error checking and recursive operations. In some such embodiments, the table mapping engine receives the configuration state data from the state storage 710, extracts the input set of routes from the configuration state, and passes those input routes to the route processing engine. The route processing engine generates an output set of routes and returns the output data to the table mapping engine, which stores the computed state in the state storage (and uses the computed state to generate information for distribution to the managed forwarding elements and gateways. For purposes of this section, however, the state computation module 715 is treated as a single entity. The details of the table mapping engine and route processing engine are described in greater detail below in Section III.

The operation of the controller 700 to receive configuration state, including static router information, and process that configuration state will now be described by reference to FIGS. 7-9. FIG. 7 conceptually illustrates the receipt of a logical network configuration 720 by the controller 700. As shown, the API 705 receives a configuration 720 for a logical network through one or more API calls. The logical network, as illustrated, includes two logical switches that attach to a logical router, which also connects to an external network (e.g., through a L3 gateway port). The logical switches include several ports to which VMs attach. In addition, the logical network configuration 720 indicates that one of the logical router ports connecting to a switch is assigned the subnet 11.0.0.0/24 and the other logical router port connecting to a logical switch is assigned the subnet 10.0.0.0/24, while the third logical router port connecting to an external network is assigned the subnet 18.0.0.0/24.

Though shown as a single set of data 720, in some embodiments the API 705 receives separate commands to create each of the logical forwarding elements (logical switch A, logical switch B, and the logical router). In addition, in some embodiments the attachment of each logical switch to the logical router is a separate command, as is the attachment of each VM to the logical switch.

The figure also illustrates a portion of the external physical network 18.0.0.0/24 to which the logical router gateway port connects. Specifically, the external physical network includes two physical routers, with interfaces 18.0.0.1 and 18.0.0.2, respectively, connecting the logical routers to the physical network 18.0.0.0/24. While shown in the drawing along with the logical network configuration 720 in order to provide clarity, one of ordinary skill in the art will recognize that the administrator inputting the logical network configuration does not actually input the structure of the physical network. Rather, the administrator simply configures the logical router gateway port with the subnet 18.0.0.0/24.

FIG. 7 also shows that the API 705 creates objects 725-735 in the state storage 710 for the three logical forwarding elements. In some embodiments, the commands received by the API 705 instruct the API to create and/or modify these objects. The logical switch objects 730 and 735 of some embodiments store a list of logical ports, attachments to those logical ports, MAC addresses for the logical ports, etc.

As illustrated, the logical router object 725 of some embodiments includes its list of ports, two of which attach to the logical switches A and B, and a third of which attaches to the external network as an L3 gateway port. The logical router object 725 may specify whether the logical router is implemented in distributed or centralized fashion in some embodiments. In addition, the API 705 creates a set of routes 740 as part of the logical router object. In some embodiments, each of the routes is also an object (owned by the logical router object) stored in the state storage 710. As shown, the set of routes includes routes automatically generated by the API 705 based on the logical network configuration 720. Specifically, for each of the logical ports (connecting to a logical switch, L3 gateway, etc.), the API 705 generates a connected high-priority route for the network address range (e.g., IP addresses) associated with that port.

In this case, one of the routes 745 is for the port to which logical switch A attaches. This route 745 routes network addresses that fall in the range (given in Classless Inter-Domain Routing (CIDR) format) 11.0.0.0/24 to the logical output port X. In addition, the route object of some embodiments specifies the type of route (e.g., connected, because the route is based on a specific logical port), the action to take for packets with destination IP addresses in the prefix range (accept, in this case, though other routes may specify to drop packets), and the priority of the route. In some embodiments, connected routes are given the highest priority (1). In addition to the route 745, the set of routes also includes a similarly structured route to send IP addresses in the range 10.0.0.0/24 to logical output port Y. In some embodiments, the API 705 also includes a low-priority default route to send packets to a particular one of the external physical routers (e.g., 18.0.0.2) if the IP address is not otherwise recognized. Such a route might specify to send packets in the range 0.0.0.0/0 to 18.0.0.2, but with a priority of 10 (or whatever number is used for the lowest priority). Other embodiments do not specify a priority for the route 0.0.0.0/0, because by longest-prefix-matching principles all routes will always be more specific, and therefore have higher priorities. Such a route would be overruled by any more specific route, but would serve to send packets for unknown destinations to the external network by default.

Though not shown in this figure, the state computation module 715 of some embodiments identifies that the configuration state has changed, and subsequently retrieves this data in order to compute state information for distribution to the managed forwarding elements. The state computation module 715 generates flow entries and/or data tuples to distribute to the managed forwarding elements and namespaces, and distributes this computed information (e.g., via a set of physical controllers). The state computation module 715 also stores the computed state in the state storage 710.

FIG. 8 conceptually illustrates the receipt by the controller 700 of configuration data for a static route for the logical router 725. As shown, the API 705 receives a command (or set of commands) to create a static route 805 with a set of parameters. In this case, the set of parameters include a logical router identifier, a routed prefix, a next hop IP address, an action, and a priority. The logical router identifier enables the API to store the route with the appropriate logical router (in this example, the logical router created in FIG. 7). The routed prefix identifies a network address or range of network addresses to which the route applies (i.e., such that packets having destination addresses in the range will be processed according to the route). The next hop address specifies a network address to which packets having destination addresses in the range of the routed prefix should be sent (18.0.0.1 in this case). Some routes, rather than specifying a next hop, specify an output port of the router (e.g., Port Z). The action identifies, in some embodiments, whether to allow a packet through the router or to drop the packet. Some embodiments only allow for the logical router to silently drop packets or allow packets, while other embodiments also allow the logical router to reject packets (drop while sending a message that the destination is unreachable). Finally, the priority indicates how the state computation module 715 should rank the route when performing route traversal on the configuration state routes in order to identify a set of output routes for implementation in the network.

The API 705 of some embodiments generates error messages to return to the user (or application providing the API calls) if a static route is not input properly. For instance, if the static route specifies both a next hop IP and an output port, or one of these destinations and a drop packet action, or neither of these destinations with an accept action, then the API returns an error message and does not create the route. Furthermore, the API 705 may send error messages if the specified logical router does not exist, if the user attempts to manually create a connected route, if any of the network addresses are malformed, or if a route for the same prefix having the same priority already exists for the logical router.

Because the input route is correctly specified, the API 705 stores an object 810 for the static route in the set of routes 740 for the logical router 725, as the static route configuration data 805 identifies this as the logical router to which the route belongs. As shown, the data stored for the object 810 includes the information input for the route as configuration data 805: the routed prefix 20.0.0.0/24, the next hop IP address 18.0.0.1, the accept action, and the priority 4 (with 1 being the highest priority). In this case, the route specifies a next hop IP address of one of the physical routers on the external network to which the L3 gateway port Z is attached. The router 18.0.0.1 might have another interface that connects to the subnet 20.0.0.0/24, and therefore the administrator setting up the logical network would indicate via a static route that packets with those destination addresses should be sent to the particular router with the interface 18.0.0.1 (i.e., as opposed to the other router with an interface 18.0.0.2).

FIG. 9 conceptually illustrates computation performed by the network controller 700 based on the static route 810 configured for the logical router 725. When only connected routes (and, possibly, an automatically-generated default route) are present, some embodiments do not need to compute an output set of routes, as no route traversal is required. However, once the user configures static routes for the logical router, the state computation module(s) 715 may need to evaluate priority between conflicting routes, identify output ports for routes based on the specified next hop IP, etc.

As shown in this figure, the state computation module 715 retrieves a set of input routes 905 from the state storage 710 and returns a set of output routes 910 to the state storage. In some embodiments, the controller stores a separate set of objects for the output routes as compared to the objects stored for the input routes. In other embodiments, the controller stores additional information (e.g., a final action, whether the route is in use) for each route in the existing object for the route. In still other embodiments, the controller stores a set of objects with the additional information that are linked to the input routes (e.g., a first set of route objects and a second set of route status objects, with each route status object owned by a different route object).

In this example, the output set of routes 910 is stored with the logical router by the state computation module 715. The operation of the state computation module to generate the output set of routes 910 will be described in greater detail below in Section III. As shown, the logical router object 725 now includes output routes, including an output route 915 for the input route 810. The output route 915 specifies, for network addresses in the range 20.0.0.0/24, that packets should be sent to output Port Z, with a final next hop IP address of 18.0.0.1. This is based on the static route sending packets in the specified range to the IP address 18.0.0.1, which is in the range of addresses that the router sends to Port Z (via a connected route generated based on the logical network configuration).

In addition to storing this computed state in the storage 710, the state computation module 715 also generates updated data to provision the MFEs and gateways based on the updated routes. That is, the state computation generates additional data tuples and/or flow entries that incorporate the added static route, indicating to forward packets with destination addresses in the range 20.0.0.0/24 to the logical output port for the L3 gateway, to the next hop IP address 18.0.0.1.

One example for which a user might configure static routes occurs when a logical router has multiple output ports connecting to an external network, which are implemented on different gateways (which might connect to different physical routers in the external network). The user might want packets for a specific external destination sent out either via a specific gateway or via a specific external router, and this information could be incorporated into a static route (i.e., specifying, for packets to the destination's network address, the next hop IP address of the specific router, or the output port associated with the specific gateway). Similarly, as in the case shown in FIG. 7, a single logical router output port might connect to a physical network with multiple physical routers, and the user might want packets for different destinations sent to the different routers (e.g., if the different physical routers have interfaces to different networks).

Figure 10:
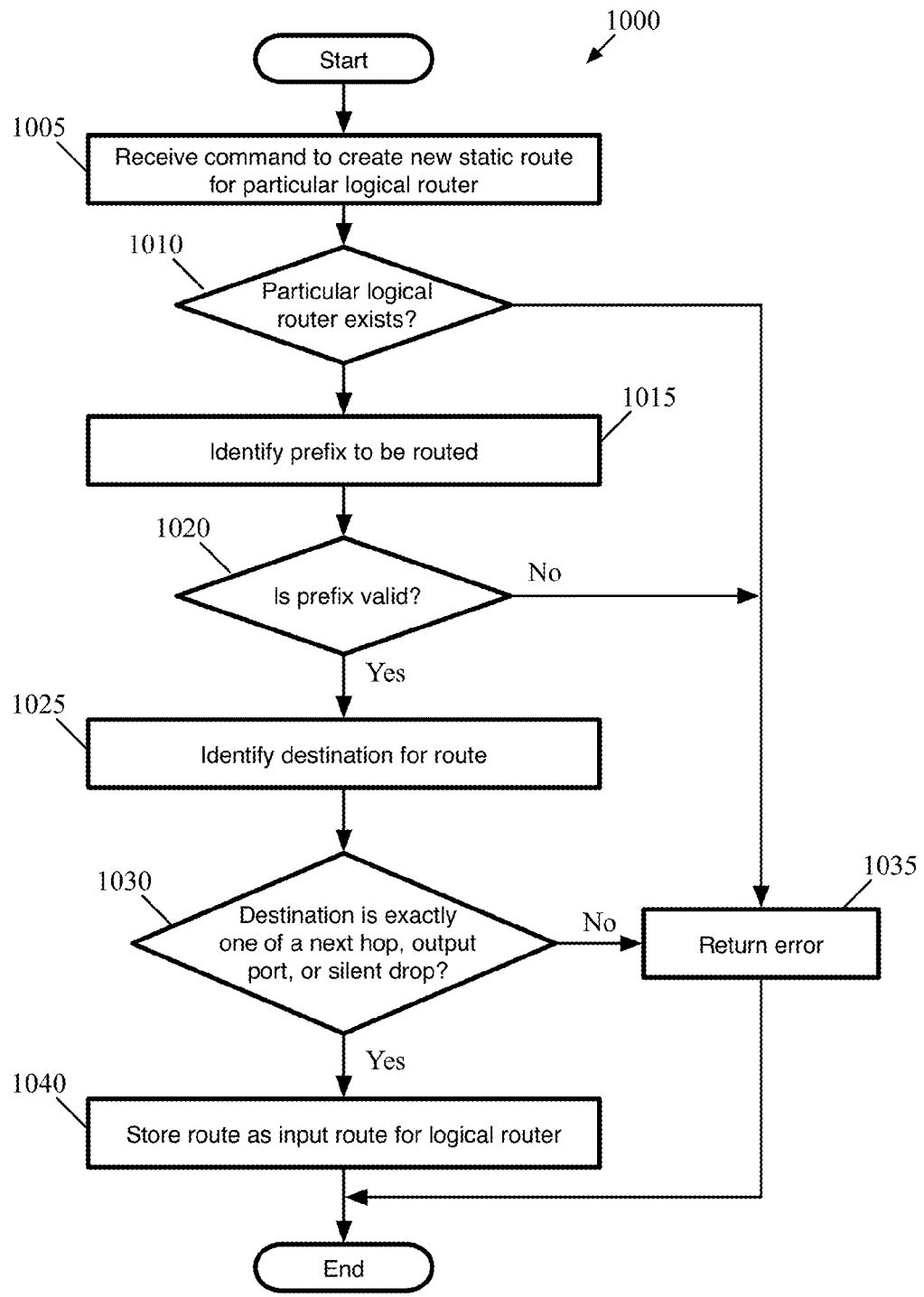
FIG. 10 conceptually illustrates a process of some embodiments for receiving a logical static route, determining whether the route is valid, and storing the route as configuration state data if valid.

FIG. 10 conceptually illustrates a process 1000 of some embodiments for receiving a logical static route, determining whether the route is valid, and storing the route as configuration state data if valid. In some embodiments, the process 1000 is performed by a network controller (e.g., by the API of the network controller).

As shown, the process 1000 begins by receiving (at 1005) a command to create a new static route for a logical router. In some embodiments, the controller receives this through an API call to create a new route, which includes various parameters to define the route. These parameters may include the logical router for which the route is defined, the IP prefix range of packets that will be routed according to the route, a destination for the route, and a priority for the route (as well as other parameters, in some cases).

Upon receiving the route, the process determines (at 1010) whether the particular logical router for which the route is specified exists. In some embodiments, the parameters specify a logical router for the route by a unique identifier. The logical router, however, must actually be a logical router for which data is stored at the controller. In some embodiments, this does not require that the controller be the master of the logical router (i.e., that the controller compute state for the logical router), as the configuration state for the logical router may be shared between the controllers. Thus, the process 1000 could be performed to receive static route information for a logical router at a controller that is not the master controller of the logical router, as the receiving controller would share the data with the master controller, which could then compute additional state information for the logical router based on the received data.

When the logical router specified in the logical route parameters does not exist, the process proceeds to 1035, which is described below. Otherwise, the process 1000 identifies (at 1015) the prefix to be routed by the static route. This is the range of destination network addresses (e.g., IP addresses) to which the route will be applied (i.e., the route will be applied to packets having a destination network address in the range specified by the prefix).

The process then determines (at 1020) whether the identified prefix is valid. In some embodiments, a valid prefix is one formatted in proper CIDR format (i.e., four 8-bit numbers, with a number of leading bits of the prefix). Thus, a prefix range of X.Y.Z.0/24 specifies any network address from X.Y.Z.0-X.Y.Z.255. Similarly, a prefix range of X.Y.Z.0/28 specifies any network address from X.Y.Z.0-X.Y.Z.127. A prefix is invalid if any of the specified numbers is greater than 8 bits (e.g., if the user attempts to specify 257.0.0.0), if more than four numbers are given, etc.

When the prefix specified for the route is invalid, the process proceeds to 1035, described below. Otherwise, the process 1000 identifies (at 1025) a destination for the route. The process then determines (at 1030) whether the destination is exactly one of a next hop network address, an output port, or a silent drop. Some embodiments actually specify these destinations as part of different parameters. For instance, in some embodiments, the static route definition allows for separate output port, next hop IP, and action parameters. The output port is used if the packets with destination addresses matching the specified prefix should be sent to a particular port of the logical router. The next hop IP address is used if the packets with destination addresses matching the specified prefix should be sent to, e.g., a particular different router (e.g., a physical router on an external network). Some embodiments require that an action be specified for the route, with possible options of accept and blackhole (i.e., silently drop, without sending an error message to the sender).

Some embodiments do not allow the configuration for a static route to specify both an output port and a next hop network address. Furthermore, when the specified action is to accept packets with destination addresses in the prefix range, exactly one of the output port and the next hop address must be specified. On the other hand, when the action specifies to drop packets, then both of the output port and the next hop address must be empty.

When one of these conditions is violated (e.g., more than one of silent drop, a next hop address, and an output port are specified, or none of these are specified), the process 1000 returns (at 1035) an error. As indicated above, an error may be returned for invalid prefixes or nonexistent logical routers, as well. Some embodiments return an error message to the source of the command (e.g., a management application, an administrator computer, etc.) that attempted to create the new route.

When the route is a valid static route, the process 1000 stores the route as an input route for the specified logical router. In some embodiments, the process creates a new route object for the static route, which is owned by a previously-created logical router object. Storing the new route, in some embodiments, automatically causes the controller to perform a route traversal process for the logical router (or, at least for the new route of the logical router) in order to identify whether to use the route, and other output information for the route. Furthermore, in some embodiments, the controller automatically shares the configured route (i.e., the input route) with other controllers, in case those controllers need to use the route to compute state information.

III. Route Processing by Controller

As indicated above, the network controller of some embodiments performs route processing operations to generate an output set of routes from an input set of routes for a logical router. Specifically, when new routes are configured for a logical router (e.g., new static routes input manually through commands to the controller, new connected routes generated based on the attachment of logical switches to ports of the logical router, etc.), some embodiments use a route processing engine in the controller to calculate the set of output routes. The route processing engine identifies final actions (e.g., a final output port, a drop action) for each routed prefix, identifies routes that should be taken out of use based on superseding higher-priority routes, and performs other actions. In some embodiments, a table mapping engine in the controller uses the data from the route processing engine to generate data tuples for distribution to network elements (e.g., managed forwarding elements, namespaces that implement L3 gateways).

Figure 11:
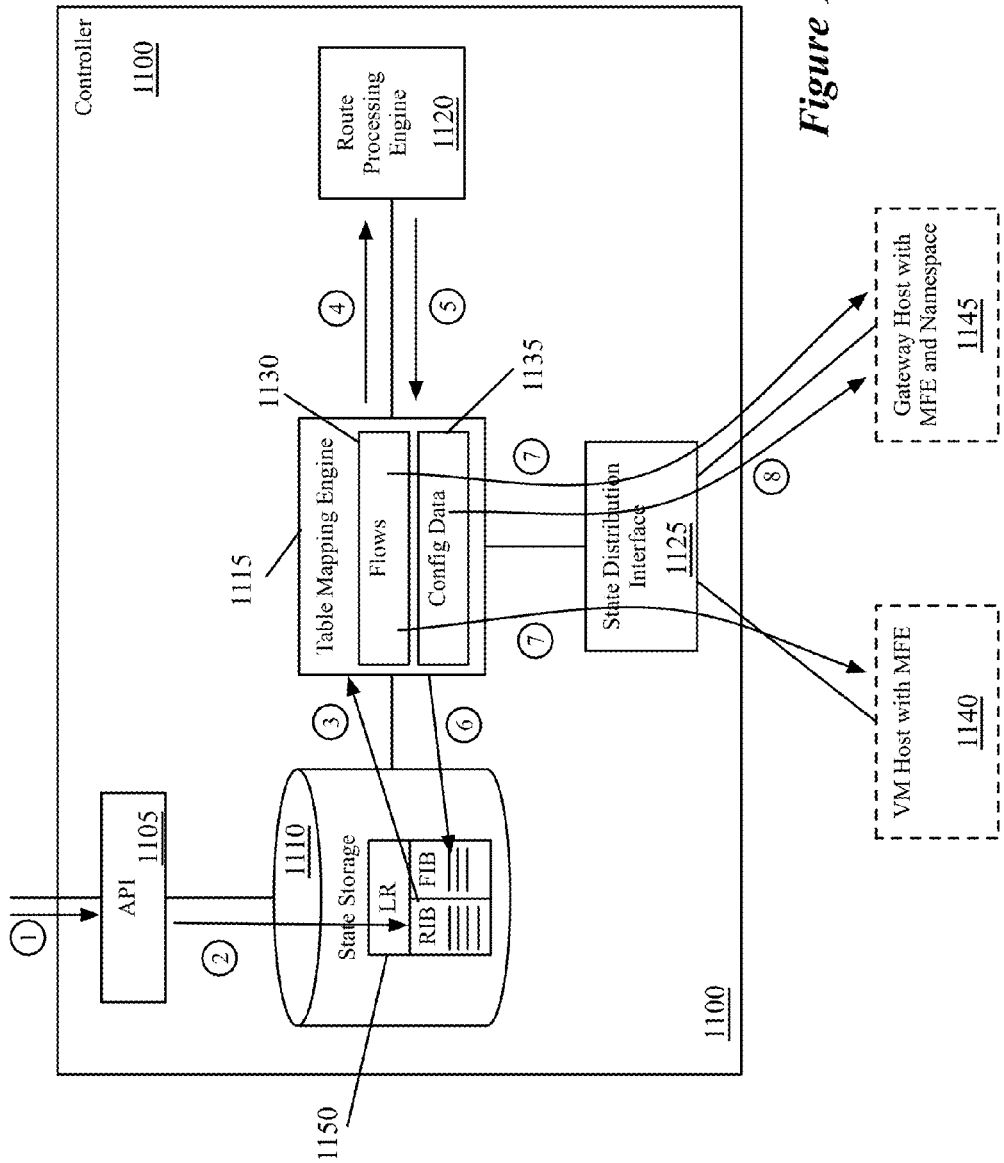
FIG. 11 conceptually illustrates a network controller of some embodiments, and the data flow through the controller as the controller performs route processing operations.

FIG. 11 conceptually illustrates a network controller 1100 of some embodiments, and the data flow through the controller as the controller performs route processing operations. The network controller 1100 includes an API 1105, a state storage 1110, a table mapping engine 1115, a route processing engine 1120, and a state distribution interface 1125, similar to the network controller 100 described above.

The API 1105 of some embodiments provides an interface through which the controller receives configuration state data for one or more logical networks. As described above by reference to FIG. 7, in some embodiments the API 1105 represents a set of methods that may be used to create, modify, delete, query, etc. logical network data in the state storage 1110. In some embodiments, a network administrator may access the controller through a direct connection (e.g., by manually inputting the API calls) or through a cloud management application. Some such API methods for the API 1105 include methods to create a logical router, create logical router ports, create a logical switch, attach a logical switch to a logical router, attach a logical port to an external network, create a static route, modify a static route, remove a static route, query a logical router for its routes, etc. These various methods, in some embodiments, enable the administrator to access or modify configuration state data for logical routers stored in the state storage 1110.

In some embodiments, the state storage 1110 stores a set of objects that define logical networks managed by the controller 1100, as well as configuration state for logical networks managed by other network controllers. Based on commands received by the API 1105, the controller 1100 creates, modifies, and deletes objects in the state storage 1110. In addition to storing the configuration state received through the API 1105, the state storage of some embodiments also stores computed state calculated by the state computation module 1115. Furthermore, the network controller 1100 may receive state information from other network controllers and network elements (e.g., MFEs, gateways operating in namespaces), as described above by reference to FIG. 7.

The table mapping engine 1115 performs state calculations for logical networks managed by the controller 1100. As shown, the table mapping engine 1115 includes a flow generation module 1130 and a configuration data generation module 1135, both of which generate data for distribution to the managed forwarding elements and L3 gateways. In some embodiments, both of these modules use similar input data tuples to generate output data tuples, but generate different data for distribution to the various network elements.

The flow generation module 1130 generates data for the managed forwarding elements to use in processing packets. Specifically, in some embodiments the flow generation module 1130 generates flow entries that take a match-action format. That is, each flow entry specifies a condition or set of conditions for a packet to match and an action or set of actions for a managed forwarding element to apply to the packet when the packet matches all of the conditions. For instance, one of many flow entries used to implement a logical router might specify that if a packet (i) has been assigned to the logical router and (ii) has a destination IP address in a particular range (e.g., 10.0.0.0/24), then take the actions of (i) writing a particular logical egress port into a register for the packet and (ii) resubmit the packet to the managed forwarding element for further processing. In some embodiments, the flow generation module 1130 generates the flow entries by performing table mapping operations (e.g., join operations) on the data stored in the state storage 1110, as well as information received from the route processing engine 1120. In some embodiments, the flow generation module 1130 of the table mapping engine 1115 outputs data for distribution via the OpenFlow protocol.

The configuration data generator 1135 generates data for both the managed forwarding elements as well as the namespaces in which logical routers and L3 gateways operate, in some embodiments. For the managed forwarding elements, the configuration data may include port and/or tunnel configuration, among other data. Whereas the MFEs receive packet processing data as flow entries, however, the namespaces that implement centralized logical routers and L3 gateways for distributed logical routers receive packet processing instructions in the format of data tuples distributed in the same manner as configuration data. For instance, for a namespace, the gateway host machine on which the namespace resides receives the definition of the namespace as a data tuple generated by the configuration data generator 1135, and receives its routing table and other network stack configuration in this format as well, in some embodiments. As with the flow generation module 1130, the configuration data generator 1135 of some embodiments generates configuration data by performing table mapping operations (e.g., join operations) on the data stored in the state storage 1110, as well as information received from the route processing engine 1120. In some embodiments, the configuration data generator 1135 outputs data for distribution via the OVSDB protocol.

The route processing engine 1120 of some embodiments receives a set of routes from the table mapping engine 1115 (e.g., routes automatically generated based on the subnets to which the logical ports of the logical router connect, static routes received through the API 1105) and performs a recursive traversal process on the routes in order to identify a final logical destination for each network address range routed by the logical router. When multiple input routes provide contradictory information for a particular network address or range of addresses, the route processing engine 1120 of some embodiments determines which route has a higher priority. Some input routes may provide a next hop address rather than output port for a route. In these cases, the route processing engine recursively traverses the set of input routes until reaching a route specifying either a destination output port or a drop packet action. The route processing engine 1120 returns the set of output routes, with final actions (e.g., drop packet, send to particular output port) specified for each route. In some embodiments, the route processing engine 1120 is implemented in a language different from the table mapping engine 1115 (i.e., not a table mapping language). Specifically, some embodiments implement the route processing engine in a language that is optimal for error checking and recursive traversal processes (e.g., C, C++ etc.).

The controller 1100 distributes the flow entries and configuration data for the logical router (and other data for, e.g., other logical forwarding elements, such as the logical switches of the logical network) generated by the table mapping engine 1115 to host machines via the state distribution interface 1125. The host machines shown in the figure include a first machine 1140 for hosting VMs and a second machine 1145 for hosting namespaces to implement logical routers and gateways. Both of the host machines 1140 and 1145 include managed forwarding elements for processing packets (e.g., OVS), while the gateway host 1145 also includes the logical routers and gateways to act as routers in order to process packets.

In some embodiments, the controller 1100 distributes the data through a hierarchy of other network controllers, as shown above in FIG. 5. In such embodiments, the state distribution interface is an interface with other controllers that act as intermediaries for the distribution of data to the host machines (and possibly perform additional translation of the data tuples). In some embodiments, the controller 1100 uses a Remote Procedure Call (RPC) channel to communicate with other controllers.

In other embodiments, the controller 1100 interfaces directly with the host machines 1140 and 1145 (as well as numerous other host machines) to distribute the data. In some such embodiments, the controller uses two channels for communication with each host machine: a first channel (e.g., OpenFlow) for distributing the flow entries generated by the flow entry generation module 1130 for use by the managed forwarding elements, and a second channel (e.g., OVSDB) for distributing the configuration data generated by the configuration data generator 1135.

The data flow through the network controller 1100 during its operation to process logical router information will now be described. FIG. 11 includes several encircled numbers, which indicate the flow of different data into, through, and out of the network controller 1100. One of ordinary skill in the art will recognize that the controllers of some embodiments will process data other that that which is shown, and that the data flow in this figure is meant to represent the operations performed and data transferred specifically relating to a logical router managed by the network controller.

As shown by the encircled 1, the API 1105 receives a command to create or modify the configuration of a logical router. Specifically, the command modifies the routes stored for the logical router. The command could be the creation of a new static route, the attachment of a logical switch to a port of the logical router, the creation of a new port for the logical router, the modification of an existing static route, etc.

As a result, shown by the encircled 2, the API 1105 modifies the data structure 1150 stored for the logical router (e.g., an object, such as a C++ object) in the state storage 1110. The figure illustratively shows the logical router data structure 1150 as storing a RIB (set of input routes) and FIB (set of output routes). While some embodiments use such a structure, other embodiments store data structures (e.g., objects) for each input route, owned by the logical router. After processing, in some such embodiments the logical router also stores a status data structure (e.g., object) for each route. Other such embodiments modify the route data structure after processing to include the status data. This processing will be described in further detail below.

In this example, the configuration state of the logical router 1150 is modified based on data received through the API 1105 of the controller 1100. However, in some embodiments, this configuration data could instead be received by another controller in the network control system. In this case, the other controller receives the data and updates its copy of the logical router data structure. However, because the other controller does not manage the particular logical router, the controller does not compute additional state based on the input state. The other controller does, though, propagate the modified configuration state to other controllers, including the controller 1100. In this situation, when the controller 1100 receives the update to the logical router data structure 1150, the controller 1100 proceeds as shown by the remainder of the figure.

When the configuration state of the logical router data structure 1150 is modified, the table mapping engine 1115 retrieves the state of the logical router, as shown by the encircled 3 in the figure. For changes to other data structures, and for some changes to the logical router, the table mapping engine begins computing additional state at this point. However, because the update to the logical router modifies the configuration state routes of the data structure, the table mapping engine 1115 passes the route data to the route processing engine 1120, as shown by the encircled 4.

Figure 12A:
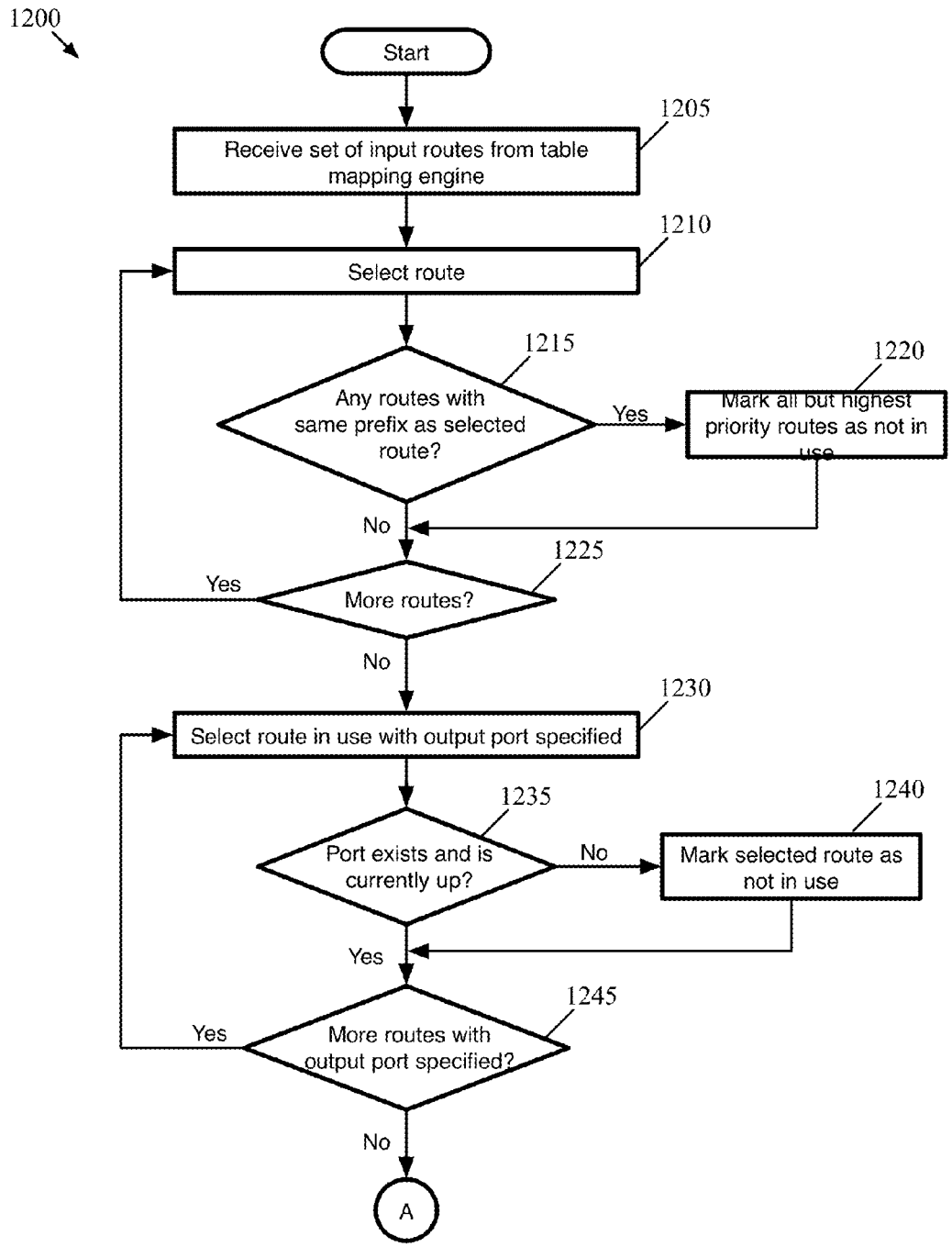
FIGS. 12A-B conceptually illustrate a process performed by the route processing engine of some embodiments to generate a set of output route information for a set of input routes of a logical router.
Figure 12B:
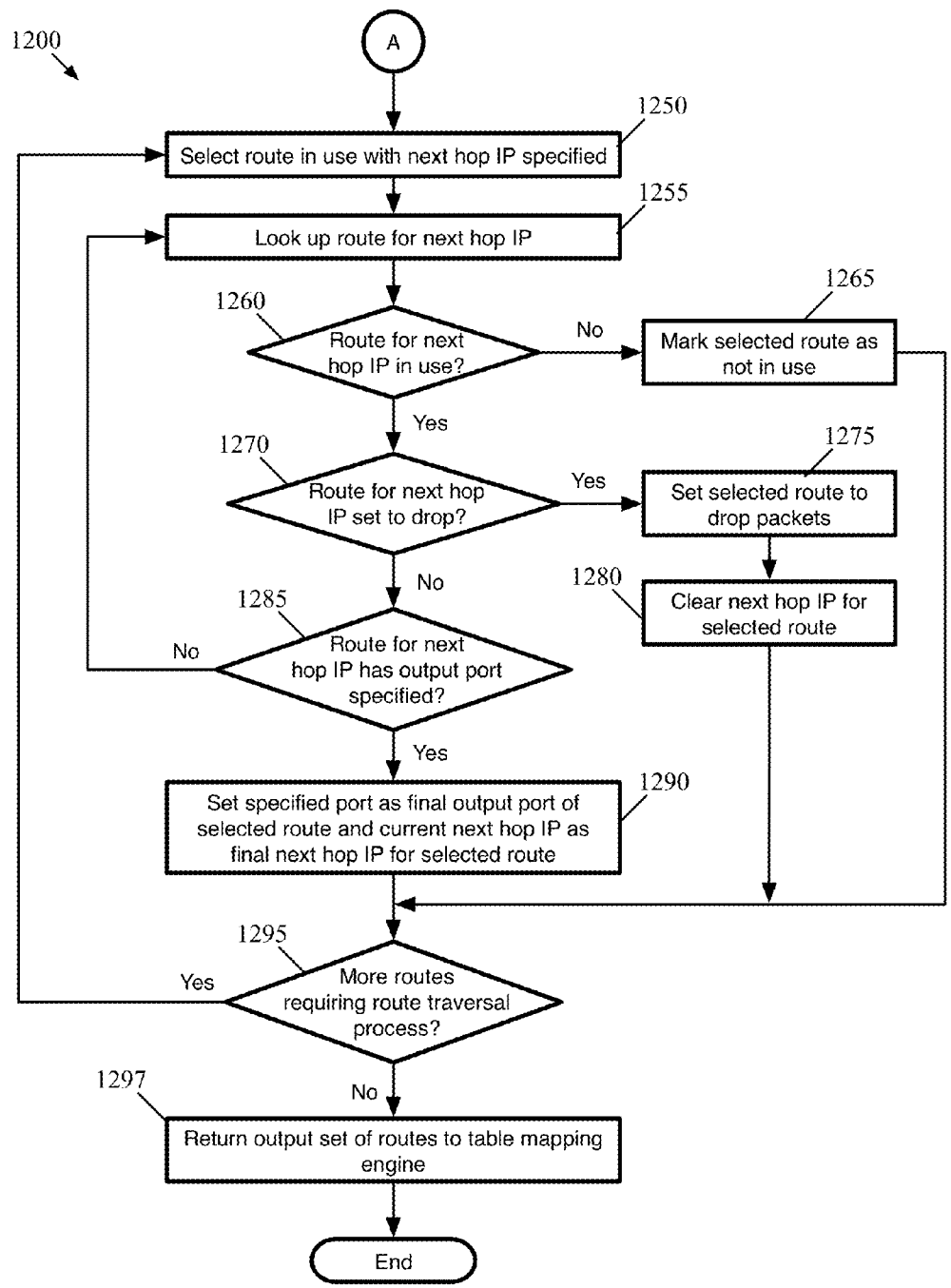

The route processing engine 1120 performs a route selection and traversal operation in order to identify the output routing table for the logical router. The operation of the route processing engine according to some embodiments is shown by FIGS. 12A and 12B. In some embodiments, the route processing engine 1120 takes as input each new or modified route for the logical router, and outputs status data for each route. For instance, for a new static route that specifies a next hop IP address, the route processing engine determines whether to use the new route and, if in use, a final output port for the route or a final action of blackhole (i.e., drop packets) for the route. The route processing engine 1120 returns the output set of routes to the table mapping engine 1115, as shown by the encircled 5.

At this point, the table mapping engine 1115 performs several actions. The output routing data computed by the route processing engine is stored in the logical router data structure 1150, as shown by the encircled 6. This figure conceptually illustrates this data as being stored in the FIB. The conceptual RIB for input configuration data and FIB for output data represent analogies to the RIB to FIB conversion performed by physical routers in traditional networks.

The table mapping engine 1115 also generates both flow entries and configuration data using the output routing data provided by the route processing engine 1120. For distributed logical routers, much of the routing for packets sent by VMs of the logical networks is performed by the first-hop MFEs, using the flow entries. As such, these flow entries use the routing data to encode the routes in a match-action format. Thus, a route specifying that a particular network address range is routed to a particular logical port will be encoded as a match on the destination address over the network address range and an action to send the packet to the logical port. Similarly, a route specifying that a particular network address range is to be blackholed will be encoded as a match on the destination address over the network address range and an action to drop the packet. In some cases, the logical router also specifies other data (e.g., routing policies, etc.) which the table mapping engine 1115 encodes in flow entries as well. Because the MFEs operate on both the VM hosts and the gateway hosts, the table mapping engine distributes the flow entries to both the host 1140 and the host 1145 through the state distribution interface 1125, as shown by the encircled 7s (though at least some of the flow entries distributed will be different between the two hosts).

In addition, the table mapping engine 1115 uses the output routing data from the route processing engine 1120 to generate configuration data for the namespace operating as a L3 gateway on the host 1145. This configuration data, in some embodiments, (i) defines the existence of the namespace and (ii) provides configuration information for the network stack in the namespace, including the routing table. Thus, the output routing data from the route processing engine 1120 is used to generate a set of data tuples defining a routing table for the namespace that implements a L3 gateway for the logical router. This data is distributed to the gateway host 1145 through the state distribution interface 1125, as shown by the encircled 8. As described above, both the flow entry data tuples and the configuration data tuples may be distributed through a hierarchy of network controllers rather than directly from the controller 1100 to the host machines 1140 and 1145 (e.g., through two different network controllers that manage the two different host machines 1140 and 1145).

The above described the data flow through a controller for logical router processing according to some embodiments. As mentioned, one of the operations performed on the data involves the route processing engine, which receives a set of input routes and outputs a set of output routes (or output routing table data about the input routes). FIGS. 12A-B conceptually illustrate a process 1200 performed by the route processing engine of some embodiments to generate a set of output route information for a set of input routes of a logical router. The process 1200 will be described by reference to FIGS. 13-16, which conceptually illustrate various example input and output sets of route information.

As shown, the process begins by receiving (at 1205) a set of input routes from the table mapping engine. As mentioned, the route processor that performs the process 1200 is, in some embodiments, a separate set of code from the table mapping engine that performs the bulk of the state computation for the network controller. The table mapping engine accesses the stored state data for a logical router (e.g., the set of route objects), determines when the route processing engine should process the state data, and passes the data to the route processing engine. In some embodiments, each route in the set of routes is an object that stores a set of parameters, including the type (e.g., connected or static), a prefix (i.e., a range of network addresses), an output port (i.e., the logical router port to which packets matching the prefix will be sent), a next hop address (i.e., the IP address of the next hop router or gateway to which packets matching the prefix will be sent), an action (e.g., accept (allow packets matching the prefix) or blackhole (drop packets matching the prefix)), and a priority (used to select between routes for the same network address).

To perform route processing, the process 1200 of some embodiments first identifies routes that are superseded by higher priority routes. Different embodiments may perform different sets of operations to identify low priority routes that should not be used, and only one possible set of operations is shown in this figure. In the example shown, the process 1200 selects one route at a time, then identifies all of the routes that should be removed from use based on having a lower priority than the selected route. Other embodiments might select one route at a time and then determine whether any other routes eliminate the selected route from use based on having a higher priority.

In this case, the process 1200 selects (at 1210) a route. Some embodiments start with the highest priority routes or the lowest priority routes, use a random or pseudo-random order, start with the earliest or latest-created routes, etc. For the selected route, the process determines (at 1215) whether any of the other input routes have the same network address range specified by their prefix as the currently selected route. In some embodiments, only routes that have the same network address range are identified at operation 1215. That is, routes with overlapping prefixes of different specificity are not identified. That is, a first route for the prefix 12.0.0.1/28 has its entire network address range encompassed by a second route for the prefix 12.0.0.0/24. However, even if the 12.0.0.0/24 route has a higher priority, the first route will not be removed. This is because the logical routers of some embodiments use longest prefix matching principles. Thus, a more specific route (e.g., a "/28" route) has an inherently higher priority than a less specific route (e.g., a "/24" route). Packets matching two routes of different specificities will be routed by the more specific route, irrespective of the listed priorities of the routes.

If any routes exist in the input routes with the same prefix as the selected route, the process marks (at 1220) all of the routes for the prefix, except the highest priority route, as not in use. This indicates that the network controller will not use the route when generating data tuples to implement the logical router. In this way, the route processing engine decreases the number of routes actually implemented in the network when the routes will not have any bearing on the processing of packets.

Figure 13:
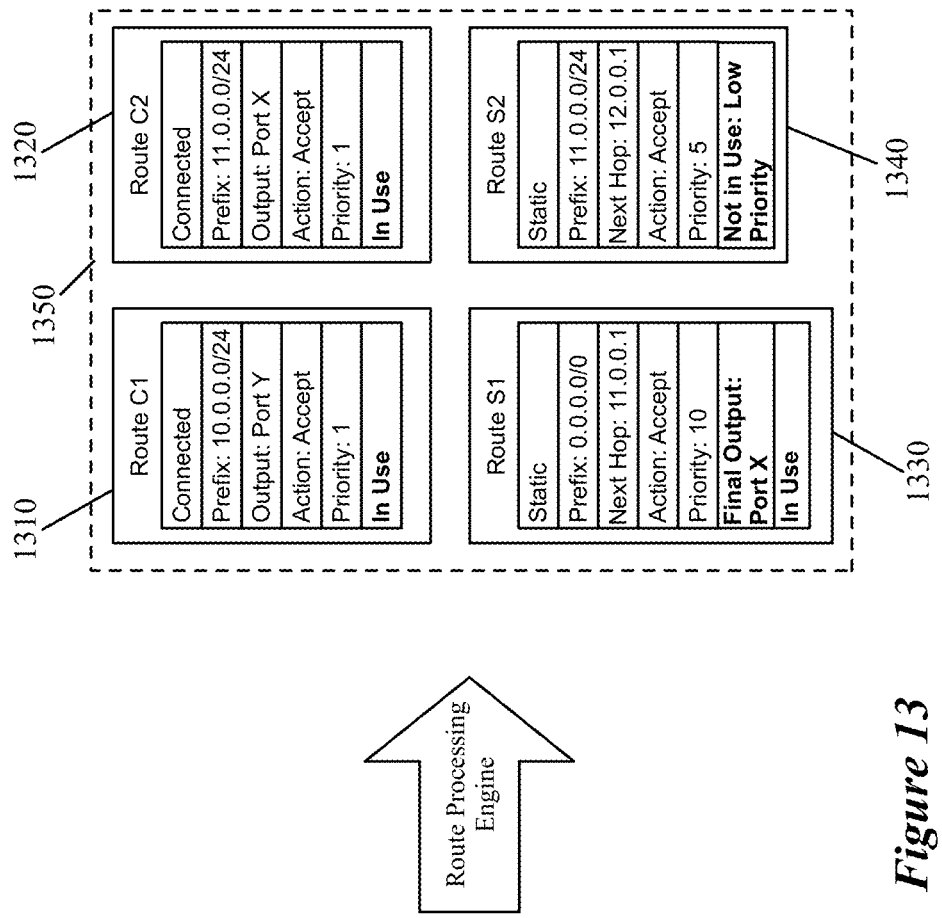
FIGS. 13-16 conceptually illustrate various example input and output sets of route information.

FIG. 13 conceptually illustrates an example set of input routes 1300 and the output set of routes 1350 for the input routes 1300, in which a low priority route is superseded by a higher-priority route. The input set of routes 1300 includes four routes 1310-1340. The first and second routes 1310 and 1320 are connected routes, based on the configuration of ports (associated with subnets 10.0.0.0/24 and 11.0.0.0/24, respectively) of the logical router (ports Y and X, respectively). These two routes have the highest priorities, being automatically-created connected routes. The third route 1330 is a static route created to act as a default route for packets that do not match any other route. The route has the lowest possible priority, which in this case is 10 (although other embodiments may use different ranges of priorities, such as 1 to 100, 1 to 250, etc.), although because the prefix has the lowest possible specificity, the priority does not matter unless multiple routes are created configured for entire possible range of IP addresses. Finally, the fourth route 1340 is a route for the prefix 11.0.0.0/24, forwarding packets with destination addresses in that range to the next hop router at IP 12.0.0.1. The route 1340 has a priority of 5. As shown by the output routing data 1350, the first three routes 1310-1330 have been marked as in use, while the route 1340 has been marked as not in use due to low priority. This occurs because the range of network addresses for which the route 1320 is the same as the range of network addresses for which the route 1340 is specified.

After marking any low priority routes that are superseded by the selected route as not in use, the process determines (at 1225) whether the set of input routes contains any additional routes to check for superseded lower-priority routes. When a route is marked as not in use, some embodiments remove the route from the set of input routes to analyze with operations 1210-1220. When more routes remain for analysis by these operations, the process returns to 1210 to select another route.

Once all of the routes have been processed to remove low priority routes, the route processing engine then removes routes that send packets to ports that are not in use. For this, the process 1200 selects (at 1230) a route that is in use (i.e., that has not been marked as not in use) and specifies an output port. As with operation 1210, different embodiments may select the routes in an order based on priority, time of creation, etc. In this case, though, only routes that specify a destination output port (i.e., a port of the logical router) are selected. As described above, routes may either specify a destination output port, a destination next hop IP address, or a drop action, but not more than one of these. For this operation, the route processing engine is only interested in the routes that specify destination output ports.

For the selected route, the process determines (at 1235) whether the port exists and is currently up. In some cases, the route may specify as its destination a logical port that does not exist. For instance, a user might create a logical router with six ports, and then create a static route pointing to the fifth port. If the user then modifies the logical router to remove the fifth and sixth ports, the static route will point to a non-existent port. Furthermore, a port might not be in use. If, in the previous example, the user does not attach the fifth port to any destinations (e.g., an external network, a logical switch, etc.), then the port will not be in use.

If the selected route specifies as a destination an output logical port that either does not exist or is down (not in use), then the process 1200 marks (at 1240) the selected route as not in use. This indicates that the network controller will not use the route when generating data tuples to implement the logical router. This prevents the implementation of the logical router from sending packets to logical ports that do not map to a physical destination.

Figure 14:
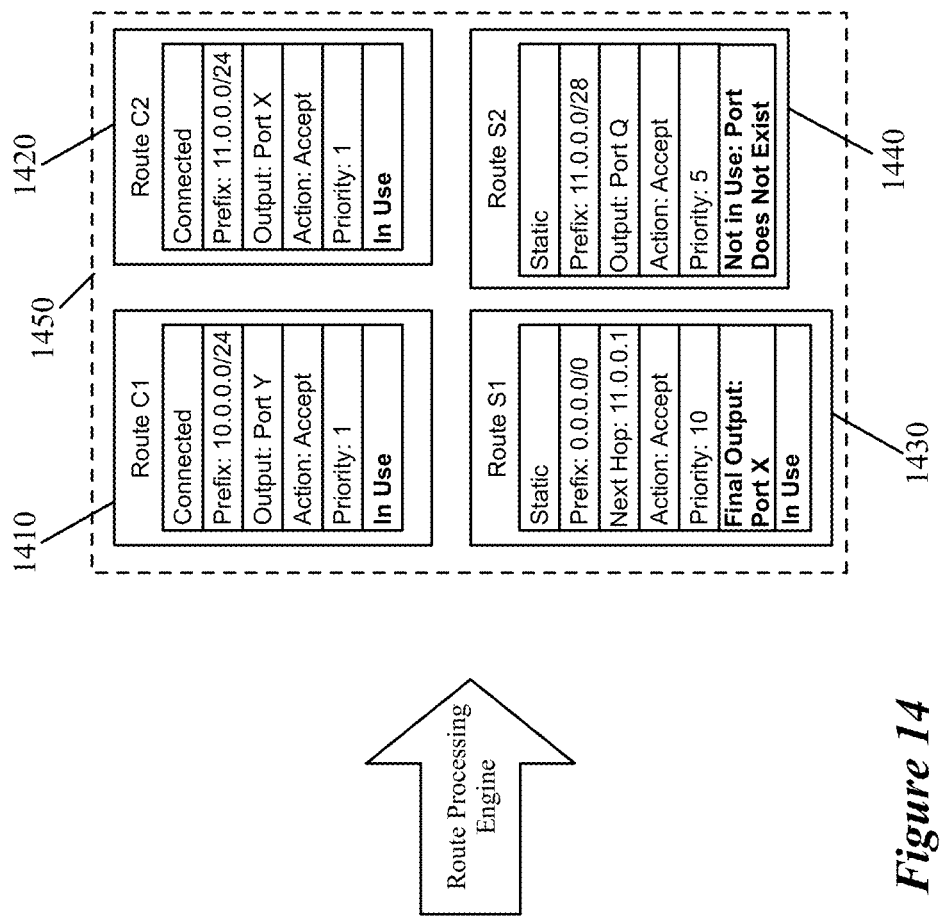
Figure 14:
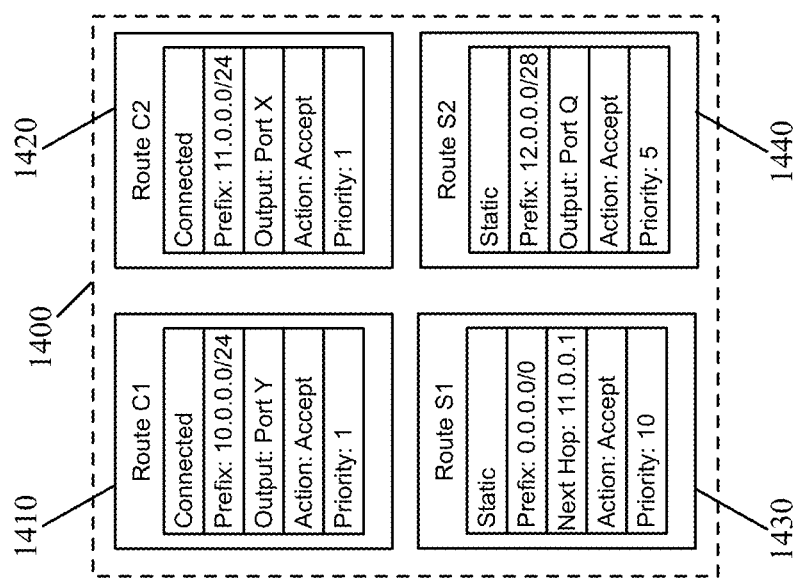

FIG. 14 conceptually illustrates an example set of input routes 1400 and the output set of routes 1450 for the input routes 1400, in which route specifies an output port that does not exist. The input set of routes 1400 includes four routes 1410-1440. The first and second routes 1410 and 1420 are connected routes, based on the configuration of ports (associated with subnets 10.0.0.0/24 and 11.0.0.0/24, respectively) of the logical router (ports Y and X, respectively). The third route 1430 is a static route created to act as a default route for packets that do not match any other route. Finally, the fourth route 1440 is a static route for the prefix 12.0.0.0/28, specifying an output port Q. However, the port Q does not exist for the logical router for which the routes 1410-1440 are defined. As shown by the output routing data 1450, the first three routes 1410-1430 have been marked as in use, while the route 1440 has been marked as not in use due to the port not existing. Similarly, if the port Q was not currently in use, the route 1440 would be marked as not in use due to the port not being in use. In this case, if the user created a port Q for the logical router, and attached the port Q to a destination, then the route processing engine would re-evaluate the routes and classify the route 1340 as in use.

After evaluating each route specifying an output port, the process 1200 determines (at 1245) whether the set of input routes in use includes any additional routes that specify output port destinations. When more such routes exist, the process returns to 1230 to select the next such route. After checking all of the routes that specify output ports, the process 1200 then begins the recursive route traversal operations. These operations, for each route, identify either a destination output port or a drop action, based on following the paths specified by the set of routes.

As shown, the process selects (at 1250) a route that is in use (i.e., not superseded by a higher-priority route) and specifies a next hop destination IP address (rather than a drop packet action or an output port destination). Similar to operations 1210 and 1230, different embodiments select the routes in a different order.

For the selected route, the process looks up (at 1255) a route for the specified destination next hop IP address. So long as a default route (for the prefix 0.0.0.0/0) is included in the input set of routes, then all IP addresses will match at least one route. If the IP address maps to the prefixes of multiple routes, then operation 1255 uses the route with the longest prefix match in some embodiments. For instance, if the selected route specifies a next hop IP of 20.1.1.1, and routes exist for the prefixes 20.0.0.0/8 and 20.1.1.0/24, the route processor uses the route for the more specific prefix 20.1.1.0/24.

The process 1200 then determines (at 1260) whether the route identified for the next hop IP is in use. In general, the routes are in use by default unless marked as not in use for either low priority or a port-related issue (the port being down or nonexistent). In this case, lower priority routes will not be identified for a next hop IP, because the higher-priority route will always be an option. When the highest-priority (and most specific) route identified for the next hop is not in use, then the process marks (at 1265) the selected route as not in use, and proceeds to operation 1295 to determine whether additional routes require the route traversal process.

Otherwise, if the route for the next hop IP is still in use, the process determines (at 1270) whether the route for the next hop IP address is set to drop packets. As mentioned, some routes may specify a drop packet action rather than an accept packet action with a destination. If the identified route for the next hop is set to drop packets, the process 1200 sets (at 1275) the currently selected route (selected at operation 1250) to also drop packets and clears (at 1280) the previously specified next hop IP for the selected route, then proceeds to operation 1295. Because some embodiments do not allow a route to specify a destination (e.g., a next hop IP address) and specify to drop packets, when the route processor sets the drop packet action for a route, the route processor also removes the next hop IP for the route in order to satisfy these criteria. In some embodiments, the route processor does not modify the route object, but rather a route status object that specifies the output settings for the route to be used by the table mapping engine to generate data tuples for implementation of the logical router. In some such embodiments, the route processor sets a final action parameter for the route status to drop packets and clears a final next hop IP parameter, but does not change the configured route data.

If the identified route for the next hop IP does not specify a drop packet action, the process then determines (at 1285) whether the route identified for the next hop IP address specifies an output port destination. At this point, the route identified at operation 1255 either specifies (i) another next hop IP address or (ii) an output port as its destination, as it does not specify a drop packet action.

When the identified route does not specify an output port destination (i.e., specifies another next hop IP address), the process returns to operation 1255 to look up a route for the next hop IP address specified by the route identified at the previous iteration of operation 1255. Thus, if a first route for the prefix 13.0.0.0/24 specifies a next hop gateway IP of 14.0.0.1, and a second route for the prefix 14.0.0.0/24 specifies a next hop gateway IP of 15.0.0.1, then the route processor looks up a third route for 15.0.0.1 and attempts to use the specified action or destination for this route to resolve the first route. The process continues recursively attempting to resolve the routes until it reaches a route that (i) not in use, (ii) specifies a drop action, or (iii) specifies an output port.

When the most recently identified route specifies an output port as its destination, the process sets (at 1290) the final output port of the selected route as the output port specified by the most recently identified route. In addition, the process sets the current next hop IP (i.e., the next hop IP for which the most recently identified route was identified) as the final next hop IP for the selected route (i.e., the route selected at operation 1250).

Figure 15:
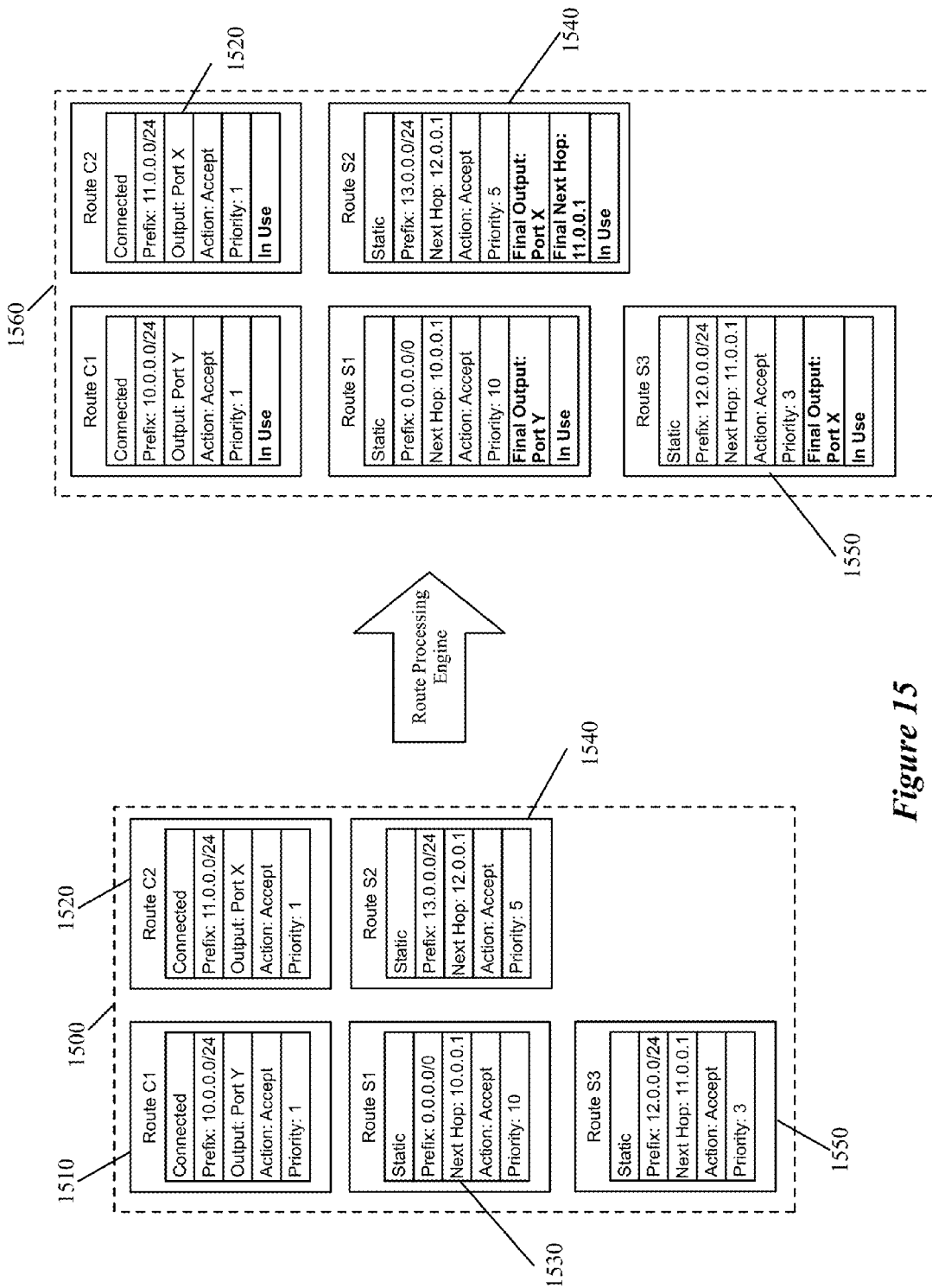
Figure 16:
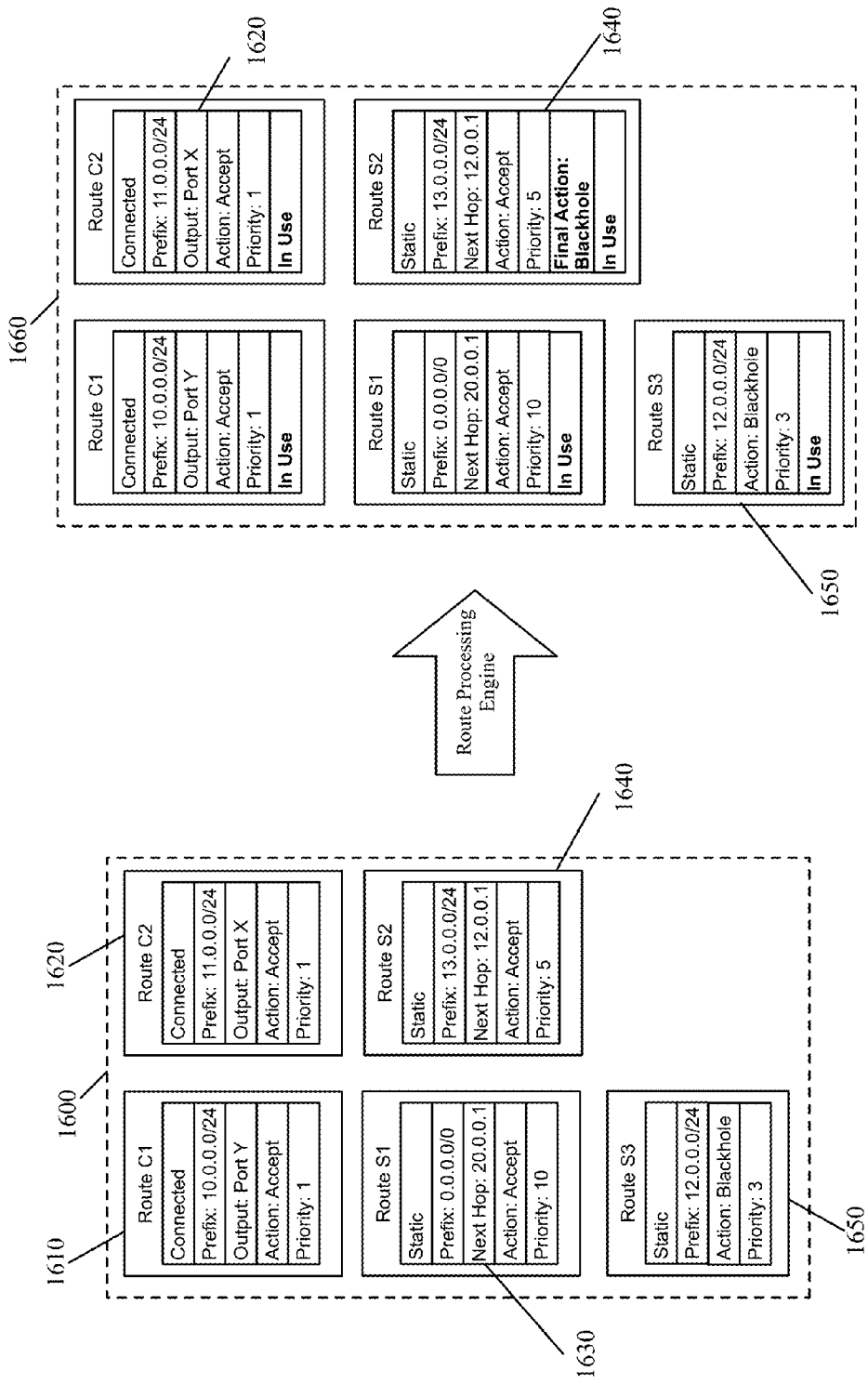

FIGS. 15 and 16 conceptually illustrate two different example sets of input routes and the output sets of routes for these input routes after the route traversal process is performed. FIG. 15 illustrates an input set of routes 1500 that includes five routes 1510-1550. The first three routes (two connected routes 1510 and 1520, and a default route 1530) are the same as in the previous examples of FIGS. 13 and 14. The fourth route 1540 is for the prefix 13.0.0.0/24, and specifies an accept action with a next hop IP address of 12.0.0.1. The fifth route 1550 is for the prefix 12.0.0.0/24, and specifies a next hop IP address of 11.0.0.1.

As the first two routes 1510-1530 specify output ports as their destinations, these routes are simply marked as in use in the output set of routes 1560, and no traversal is required. In some embodiments, though not shown in this figure for simplicity, the route processor copies the output ports into a final output port route status field for each of these routes 1510-1530, and similarly copies the action of 'accept' into a final action status field for the routes. For the route 1540, the route traversal process first looks up a route for the next hop IP address of 12.0.0.1, and identifies the route 1550. Because this route specifies a next hop IP destination of 11.0.0.1, the route traversal process next looks up a route for this IP address, and identifies the route 1520. At this point, the newly identified route specifies an output port, so this output port X and the final next hop IP address (11.0.0.1) are copied into the final status data for the output route 1540. For the route 1550, the route traversal process involves fewer recursive lookups, as the first route identified is the route 1520, which specifies the output port X. As such, the output route 1540 includes the final output port X. In some embodiments, the route processor also copies the next hop IP 11.0.0.1 into a final next hop IP field for the output. The default route 1530 specifies a next hop IP 10.0.0.1, which resolves to Port Y after the recursive route traversal.

FIG. 16 illustrates an input set of routes 1600 that includes five routes 1610-1650. The first four routes 1610-1640 are the same as in the previous example of FIG. 15. However, the fifth route 1550 specifies a blackhole (drop packet) action for the prefix 12.0.0.0/24, rather than a next hop IP address or output port. As such, for the route 1640, the route traversal process first looks up a route for the next hop IP address of 12.0.0.1, and identifies the route 1650. This route specifies a blackhole action rather than a next hop IP or output port, and therefore the traversal process identifies at this point that the final action for the route 1640 is to drop packets, and copies the blackhole action into the final action for the output route 1640.

Returning to the process 1200, after a selected route has been resolved and any needed output data generated for the route, the process determines (at 1295) whether any additional routes remain that require the route traversal process (i.e., are not marked as not in use, and specify a next hop IP address). When additional routes remain, the process returns to 1250 to select another route for traversal. Once all of the routes have been analyzed and the output data generated for the routes, the process 1200 returns (at 1297) the output set of routes to the table mapping engine, so that the table mapping engine can use the output status data to generate the data tuples used by the MFEs and gateways to implement the logical router.

IV. Electronic System

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 17:
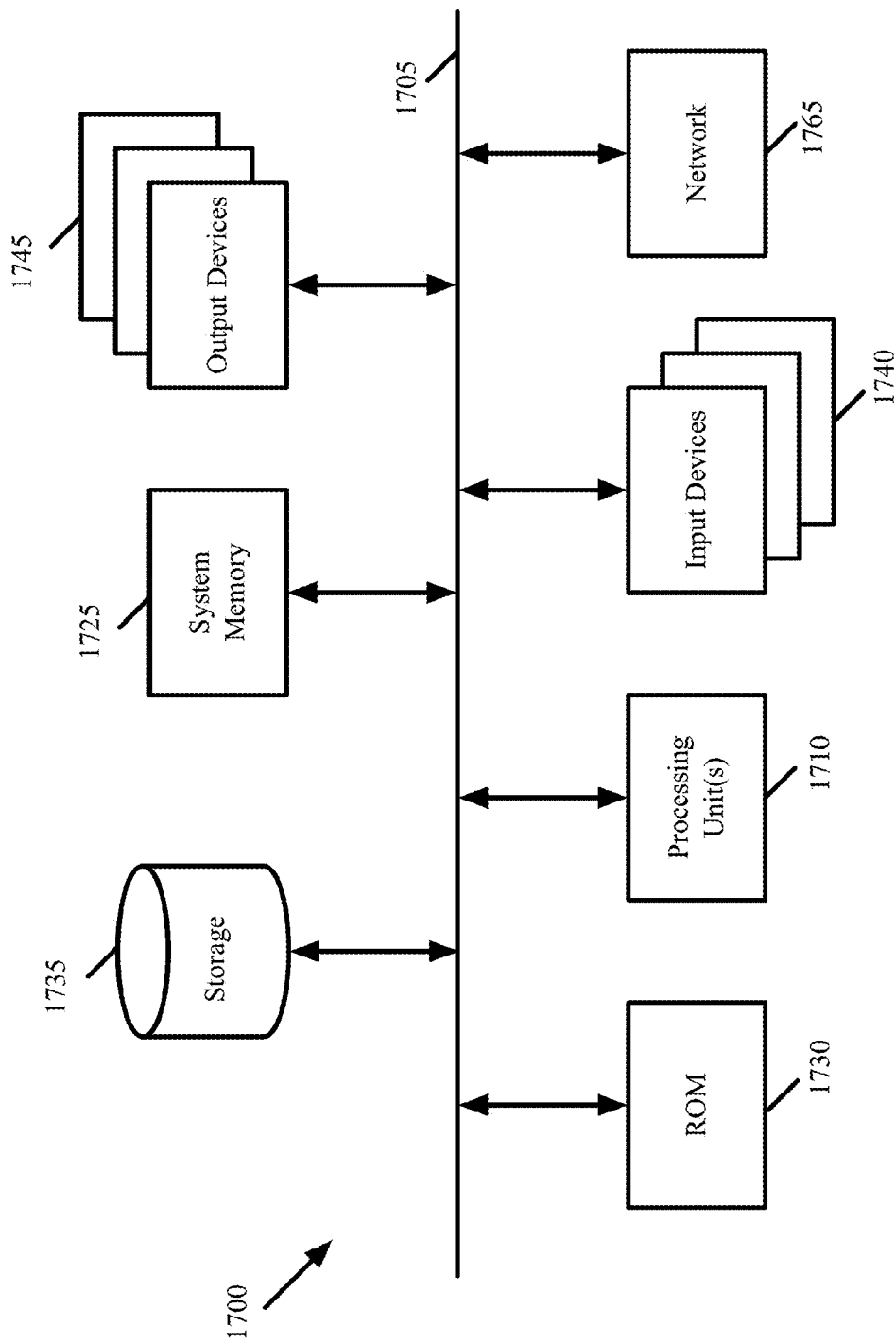
FIG. 17 conceptually illustrates an electronic system with which some embodiments of the invention are implemented.

FIG. 17 conceptually illustrates an electronic system 1700 with which some embodiments of the invention are implemented. The electronic system 1700 can be used to execute any of the control, virtualization, or operating system applications described above. The electronic system 1700 may be a computer (e.g., a desktop computer, personal computer, tablet computer, server computer, mainframe, a blade computer etc.), phone, PDA, or any other sort of electronic device. Such an electronic system includes various types of computer readable media and interfaces for various other types of computer readable media. Electronic system 1700 includes a bus 1705, processing unit(s) 1710, a system memory 1725, a read-only memory 1730, a permanent storage device 1735, input devices 1740, and output devices 1745.

The bus 1705 collectively represents all system, peripheral, and chipset buses that communicatively connect the numerous internal devices of the electronic system 1700. For instance, the bus 1705 communicatively connects the processing unit(s) 1710 with the read-only memory 1730, the system memory 1725, and the permanent storage device 1735.

From these various memory units, the processing unit(s) 1710 retrieve instructions to execute and data to process in order to execute the processes of the invention. The processing unit(s) may be a single processor or a multi-core processor in different embodiments.

The read-only-memory (ROM) 1730 stores static data and instructions that are needed by the processing unit(s) 1710 and other modules of the electronic system. The permanent storage device 1735, on the other hand, is a read-and-write memory device. This device is a non-volatile memory unit that stores instructions and data even when the electronic system 1700 is off. Some embodiments of the invention use a mass-storage device (such as a magnetic or optical disk and its corresponding disk drive) as the permanent storage device 1735.

Other embodiments use a removable storage device (such as a floppy disk, flash drive, etc.) as the permanent storage device. Like the permanent storage device 1735, the system memory 1725 is a read-and-write memory device. However, unlike storage device 1735, the system memory is a volatile read-and-write memory, such a random access memory. The system memory stores some of the instructions and data that the processor needs at runtime. In some embodiments, the invention's processes are stored in the system memory 1725, the permanent storage device 1735, and/or the read-only memory 1730. From these various memory units, the processing unit(s) 1710 retrieve instructions to execute and data to process in order to execute the processes of some embodiments.

The bus 1705 also connects to the input and output devices 1740 and 1745. The input devices enable the user to communicate information and select commands to the electronic system. The input devices 1740 include alphanumeric keyboards and pointing devices (also called "cursor control devices"). The output devices 1745 display images generated by the electronic system. The output devices include printers and display devices, such as cathode ray tubes (CRT) or liquid crystal displays (LCD). Some embodiments include devices such as a touchscreen that function as both input and output devices.

Finally, as shown in FIG. 17, bus 1705 also couples electronic system 1700 to a network 1765 through a network adapter (not shown). In this manner, the computer can be a part of a network of computers (such as a local area network ("LAN"), a wide area network ("WAN"), or an Intranet, or a network of networks, such as the Internet. Any or all components of electronic system 1700 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While the invention has been described with reference to numerous specific details, one of ordinary skill in the art will recognize that the invention can be embodied in other specific forms without departing from the spirit of the invention. In addition, a number of the figures (including FIGS. 10 and 12) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

We claim:

1. A network controller for managing a logical network that is implemented across a plurality of managed network elements, the logical network comprising at least one logical router, the network controller comprising:
   an input interface for receiving configuration state for the logical router;
   a table mapping engine for generating data tuples for distribution to the plurality of managed network elements in order for the managed network elements to implement the logical router; and
   a route processing engine for (i) receiving a set of input routes from the table mapping engine based on the configuration state for the logical router, (ii) performing a recursive route traversal process to generate a set of output routes, and (iii) returning the set of output routes to the table mapping engine,
   wherein the table mapping engine uses the set of output routes to generate the data tuples for distribution to the plurality of managed network elements.

2. The network controller of claim 1, wherein the table mapping engine is implemented in a first programming language, and the route processing engine is implemented in a second, different programming language.

3. The network controller of claim 2, wherein the first programming language is a table mapping language for mapping input tables to output tables using join operations.

4. The network controller of claim 2, wherein the second programming language is an object-oriented language optimal for recursive processes and error checking.

5. The network controller of claim 1, wherein the network controller further comprises a network state data storage structure that stores (i) the configuration state received by the input interface and (ii) computed state generated by the table mapping engine.

6. The network controller of claim 5, wherein the computed state comprises the data tuples for distribution to the plurality of managed network elements.

7. The network controller of claim 1, wherein the managed network elements comprise managed forwarding elements that operate in virtualization software of a plurality of host machines at which virtual machines that communicate through the logical network are hosted.

8. The network controller of claim 7, wherein the data tuples generated by the table mapping engine comprise flow entries for distribution to the managed forwarding elements, wherein at least one of the flow entries specifies a set of actions to take with a packet when the packet matches a set of conditions.

9. The network controller of claim 8, wherein the set of conditions comprises a range of destination network addresses and the set of actions comprises logically forwarding the packet to an egress port of the logical router.

10. The network controller of claim 1, wherein the managed network elements comprise L3 gateways implemented in virtualized containers at gateway host machines in order to connect the logical network to an external network.

11. The network controller of claim 10, wherein the data tuples generated by the table mapping engine comprise configuration data defining the virtualized container and a routing table for implementation by the virtualized container.

12. The network controller of claim 11, wherein the virtualized container is a namespace and the routing table is one of several elements of a network stack operating in the namespace.

13. The network controller of claim 10, wherein the managed network elements further comprise managed forwarding elements that operate in virtualization software at the gateway host machines in order to forward packets to and receive packets from the virtualized containers.

14. The network controller of claim 13, wherein the data tuples generated by the table mapping engine comprise (i) flow entries for distribution to the managed forwarding elements and (ii) configuration data for distribution to applications that manage the virtualized containers.

15. For a network controller, a method comprising:
    receiving configuration state for a logical router managed by the network controller, the configuration state comprising a first set of routes for the logical router;
    at a route processing engine of the network controller, performing a recursive route traversal process to generate a second set of routes from the first set of routes; and
    at a table mapping engine of the network controller, generating a plurality of data tuples based on the second set of routes, for distribution to a plurality of managed network elements that operate on a plurality of host machines in order to implement the logical router.

16. The method of claim 15, wherein each route in the first set of routes specifies one of (i) a next hop network address, (ii) an output port, and (iii) a drop packet action for packets with network addresses in a network address range for which the route is defined, wherein performing the recursive route traversal process to generate the second set of routes comprises:
    when the first set of routes comprises multiple routes for a particular network address range, removing from the second set of routes all routes for the particular network address range other than a highest priority route for the particular network address range;
    removing from the second set of routes any route in the first set of routes that specifies an output port that does not exist or that is not in use;
    for each route in the first set of routes that specifies a next hop network address, identifying one of an output port and a drop packet action by traversing the first set of routes based on the next hop network address.

17. The method of claim 16, wherein traversing the first set of routes for a first route that specifies a first next hop network address comprises:
    identifying a second route for packets with the first next hop network address;
    when the second route specifies one of an output port and a drop packet action, using the specified output port or drop packet action for the first route; and
    when the second route specifies a second next hop network address, identifying a third route for packets with the second next hop network address.

18. The method of claim 15, wherein the route processing engine is implemented in a first programming language and the table mapping engine is implemented in a second table mapping language.

19. The method of claim 15 further comprising, at the table mapping engine, generating a second plurality of data tuples for a logical switch managed by the network controller based on configuration state defined for the logical switch, without using any data generated by the route processing engine.

20. The method of claim 19, wherein the configuration state is received through an application programming interface of the network controller.

21. The method of claim 19, wherein the network controller is a first network controller, wherein the configuration state is received through an interface with a second network controller.

22. The method of claim 21, wherein the second network controller receives the configuration state through an application programming interface.

* * * * *